(12) United States Patent
Reybok, Jr. et al.

(10) Patent No.: US 11,539,720 B2
(45) Date of Patent: *Dec. 27, 2022

(54) COMPUTER NETWORK THREAT ASSESSMENT

(71) Applicant: ServiceNow, Inc., Santa Clara, CA (US)

(72) Inventors: Richard Reybok, Jr., Fremont, CA (US); Jeffrey Rhines, San Antonio, TX (US); Kurt Joseph Zettel, II, Nashville, TN (US); Henry Geddes, Marin, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/902,193

(22) Filed: Jun. 15, 2020

(65) Prior Publication Data

US 2020/0314124 A1    Oct. 1, 2020

Related U.S. Application Data

(63) Continuation of application No. 15/373,662, filed on Dec. 9, 2016, now Pat. No. 10,686,805.

(Continued)

(51) Int. Cl.
*H04L 9/40*    (2022.01)
*G06F 16/23*    (2019.01)

(52) U.S. Cl.
CPC .......... *H04L 63/1416* (2013.01); *G06F 16/23* (2019.01); *H04L 63/02* (2013.01);
(Continued)

(58) Field of Classification Search
CPC ................. H04L 63/1416; H04L 63/02; H04L 63/0428; H04L 63/06; H04L 63/14;
(Continued)

(56) References Cited

U.S. PATENT DOCUMENTS 6,609,122 B1    8/2003    Ensor
6,848,015 B2    1/2005    Jones
(Continued)

OTHER PUBLICATIONS

Australian Office Action for Auslialian Application No. 2019261802 dated, Jan. 6, 2021, 6 pgs.
(Continued)

*Primary Examiner* — Kambiz Zand
*Assistant Examiner* — Mahabub S Ahmed
(74) *Attorney, Agent, or Firm* — Fletcher Yoder PC

(57) ABSTRACT

Systems and methods are disclosed for computer network threat assessment. For example, methods may include receiving from client networks respective threat data and storing the respective threat data in a security event database; maintaining affiliations for groups of the client networks; detecting correlation between a network threat and one of the groups; identifying an indicator associated with the network threat, and, dependent on the affiliation for the group, identifying a client network and generating a message, which conveys an alert to the client network, comprising the indicator; responsive to the message, receiving, from the client network, a report of detected correlation between the indicator and security event data maintained by the client network; and updating the security event database responsive to the report of detected correlation.

21 Claims, 10 Drawing Sheets

Related U.S. Application Data

(60) Provisional application No. 62/266,435, filed on Dec. 11, 2015.

(52) U.S. Cl.
CPC .......... *H04L 63/0428* (2013.01); *H04L 63/06* (2013.01); *H04L 63/14* (2013.01); *H04L 63/1425* (2013.01); *H04L 63/1433* (2013.01); *H04L 63/20* (2013.01)

(58) Field of Classification Search
CPC . H04L 63/1425; H04L 63/1433; H04L 63/20; G06F 17/30345; G06F 16/23; G06F 21/554
USPC ...................................................... 726/22–25
See application file for complete search history.

(56) References Cited

U.S. PATENT DOCUMENTS

| | | | |
|---|---|---|---|
| 7,010,696 B1 | 3/2006 | Cambridge et al. | |
| 7,020,706 B2 | 3/2006 | Cates | |
| 7,028,301 B2 | 4/2006 | Ding | |
| 7,062,683 B2 | 6/2006 | Warpenburg | |
| 7,076,801 B2 | 7/2006 | Gong et al. | |
| 7,100,195 B1 | 8/2006 | Underwood | |
| 7,131,037 B1 | 10/2006 | LeFaive | |
| 7,170,864 B2 | 1/2007 | Matharu | |
| 7,350,209 B2 | 3/2008 | Shum | |
| 7,418,733 B2* | 8/2008 | Connary | H04L 63/20 709/224 |
| 7,549,162 B2* | 6/2009 | Aaron | G08B 13/19656 726/12 |
| 7,603,711 B2 | 10/2009 | Scheidell | |
| 7,610,512 B2 | 10/2009 | Gerber | |
| 7,617,073 B2 | 11/2009 | Trinon | |
| 7,644,365 B2 | 1/2010 | Bhattacharya et al. | |
| 7,689,628 B2 | 3/2010 | Garg | |
| 7,716,353 B2 | 5/2010 | Golovinsky | |
| 7,769,718 B2 | 8/2010 | Murley | |
| 7,783,744 B2 | 8/2010 | Garg | |
| 7,890,802 B2 | 2/2011 | Gerber | |
| 7,925,981 B2 | 4/2011 | Pourheidari | |
| 7,930,396 B2 | 4/2011 | Trinon | |
| 7,934,253 B2* | 4/2011 | Overcash | G06F 21/55 726/22 |
| 7,945,860 B2 | 5/2011 | Vambenepe | |
| 7,966,398 B2 | 6/2011 | Wiles | |
| 8,051,164 B2 | 11/2011 | Peuter | |
| 8,201,257 B1* | 6/2012 | Andres | G06F 21/568 726/25 |
| 8,224,683 B2 | 7/2012 | Manos | |
| 8,239,668 B1 | 8/2012 | Chen et al. | |
| 8,260,914 B1* | 9/2012 | Ranjan | H04L 63/12 709/224 |
| 8,266,096 B2 | 9/2012 | Navarrete | |
| 8,286,239 B1* | 10/2012 | Sutton | H04L 63/1416 726/22 |
| 8,321,944 B1 | 11/2012 | Mayer et al. | |
| 8,402,127 B2 | 3/2013 | Solin | |
| 8,457,928 B2 | 6/2013 | Dang | |
| 8,478,569 B2 | 7/2013 | Scarpelli | |
| 8,612,408 B2 | 12/2013 | Trinon | |
| 8,674,992 B2 | 3/2014 | Poston | |
| 8,689,241 B2 | 4/2014 | Naik | |
| 8,743,121 B2 | 6/2014 | De Peuter | |
| 8,806,620 B2* | 8/2014 | Purcell | H04L 67/04 726/22 |
| 8,832,652 B2 | 9/2014 | Mueller | |
| 8,887,133 B2 | 11/2014 | Behnia | |
| 8,914,406 B1 | 12/2014 | Haugsnes et al. | |
| 9,009,827 B1* | 4/2015 | Albertson | H04L 63/14 726/22 |
| 9,038,183 B1 | 5/2015 | Haugsnes et al. | |
| 9,065,783 B2 | 6/2015 | Ding | |
| 9,098,322 B2 | 8/2015 | Apte | |
| 9,137,258 B2* | 9/2015 | Haugsnes | G06F 16/24575 |
| 9,167,001 B1 | 10/2015 | Haugsnes et al. | |
| 9,239,857 B2 | 1/2016 | Trinon | |
| 9,294,498 B1* | 3/2016 | Yampolskiy | H04L 63/1425 |
| 9,317,327 B2 | 4/2016 | Apte | |
| 9,363,252 B2 | 6/2016 | Mueller | |
| 9,401,925 B1* | 7/2016 | Guo | G06F 21/552 |
| 9,467,464 B2* | 10/2016 | Gula | H04L 63/1433 |
| 9,503,469 B2* | 11/2016 | Lin | H04L 63/1425 |
| 9,516,041 B2* | 12/2016 | Baikalov | H04L 63/1408 |
| 9,535,737 B2 | 1/2017 | Joy | |
| 9,557,969 B2 | 1/2017 | Sharma | |
| 9,645,833 B2 | 5/2017 | Mueller | |
| 9,654,473 B2 | 5/2017 | Miller | |
| 9,710,644 B2* | 7/2017 | Reybok | G06F 21/552 |
| 9,762,617 B2* | 9/2017 | Modi | H04L 63/20 |
| 9,766,935 B2 | 9/2017 | Kelkar | |
| 9,792,387 B2 | 10/2017 | George | |
| 9,805,322 B2 | 10/2017 | Kelkar | |
| 9,825,989 B1* | 11/2017 | Mehra | H04L 63/145 |
| 9,917,860 B2* | 3/2018 | Senanayake | G06F 3/04815 |
| 10,212,176 B2* | 2/2019 | Wang | H04L 63/1425 |
| 2002/0147803 A1* | 10/2002 | Dodd | H04L 63/1433 726/25 |
| 2003/0033516 A1* | 2/2003 | Howard | G06F 21/577 713/152 |
| 2003/0055689 A1* | 3/2003 | Block | G06Q 10/02 705/13 |
| 2003/0084349 A1* | 5/2003 | Friedrichs | G06F 21/55 726/22 |
| 2003/0105911 A1 | 6/2003 | Jones | |
| 2003/0120630 A1* | 6/2003 | Tunkelang | G06F 16/2455 |
| 2004/0098623 A1* | 5/2004 | Scheidell | H04L 43/00 709/224 |
| 2005/0097256 A1 | 5/2005 | Jones | |
| 2006/0075504 A1* | 4/2006 | Liu | H04L 67/104 726/25 |
| 2007/0157031 A1* | 7/2007 | Sudhakar | H04L 9/321 713/181 |
| 2007/0208600 A1* | 9/2007 | Babus | G06Q 10/04 705/7.31 |
| 2008/0034425 A1 | 2/2008 | Overcash et al. | |
| 2008/0148398 A1* | 6/2008 | Mezack | G06F 21/552 709/224 |
| 2008/0162474 A1 | 7/2008 | Thong et al. | |
| 2009/0013194 A1* | 1/2009 | Mir | G06F 21/577 713/193 |
| 2009/0112825 A1* | 4/2009 | Xu | G06F 16/36 |
| 2009/0150212 A1* | 6/2009 | Steuben | G06Q 10/10 705/7.11 |
| 2009/0178139 A1* | 7/2009 | Stute | H04L 63/1433 726/22 |
| 2009/0254970 A1* | 10/2009 | Agarwal | G06F 21/554 726/1 |
| 2009/0264970 A1 | 10/2009 | Agarwal et al. | |
| 2009/0328206 A1* | 12/2009 | Bardsley | G06F 21/552 726/22 |
| 2009/0328209 A1 | 12/2009 | Nachenberg | |
| 2010/0114701 A1* | 5/2010 | Steelberg | G06Q 30/0275 705/14.54 |
| 2011/0161848 A1* | 6/2011 | Purcell | H04L 67/04 715/764 |
| 2011/0214157 A1* | 9/2011 | Korsunsky | H04L 63/1441 726/1 |
| 2011/0225650 A1* | 9/2011 | Margolies | G06Q 10/06 726/22 |
| 2011/0283110 A1* | 11/2011 | Dapkus | G06F 21/577 713/182 |
| 2012/0072968 A1* | 3/2012 | Wysopal | G06F 21/577 726/1 |
| 2012/0109802 A1 | 5/2012 | Griffin et al. | |
| 2012/0117509 A1 | 5/2012 | Powell et al. | |
| 2012/0159624 A1 | 6/2012 | Konig | |
| 2012/0324113 A1* | 12/2012 | Prince | H04L 69/40 709/226 |

(56) References Cited

U.S. PATENT DOCUMENTS

| | | | |
|---|---|---|---|
| 2012/0328215 A1 | 12/2012 | Thong et al. | |
| 2013/0007870 A1 | 1/2013 | Devarajan et al. | |
| 2013/0060810 A1 | 3/2013 | Maman et al. | |
| 2013/0081141 A1* | 3/2013 | Anurag | G06F 21/577 726/23 |
| 2013/0247193 A1 | 9/2013 | Zaitsev | |
| 2014/0032306 A1 | 1/2014 | Sukornyk et al. | |
| 2014/0101761 A1* | 4/2014 | Harlacher | H04L 63/1425 726/23 |
| 2014/0165200 A1* | 6/2014 | Singla | G06F 21/56 726/23 |
| 2014/0172495 A1* | 6/2014 | Schneck | G06Q 10/0635 705/7.28 |
| 2014/0189873 A1 | 7/2014 | Elder et al. | |
| 2014/0201533 A1* | 7/2014 | Kruglick | H04L 63/062 713/171 |
| 2014/0201836 A1* | 7/2014 | Amsler | H04L 63/20 726/23 |
| 2014/0237598 A1* | 8/2014 | Bank | H04L 63/1416 726/24 |
| 2014/0282977 A1* | 9/2014 | Madhu | H04L 67/306 726/7 |
| 2014/0283048 A1* | 9/2014 | Howes | G06F 16/34 707/739 |
| 2014/0380488 A1* | 12/2014 | Datta Ray | G06Q 10/0635 726/25 |
| 2015/0128274 A1* | 5/2015 | Giokas | H04L 51/212 726/23 |
| 2015/0135317 A1* | 5/2015 | Tock | G06F 21/56 726/23 |
| 2015/0172311 A1* | 6/2015 | Freedman | H04L 63/20 726/1 |
| 2015/0207813 A1* | 7/2015 | Reybok | H04L 63/145 726/22 |
| 2015/0229662 A1* | 8/2015 | Hitt | H04L 63/1433 726/23 |
| 2015/0242619 A1* | 8/2015 | Bender | H04L 63/10 726/22 |
| 2015/0332054 A1* | 11/2015 | Eck | H04L 63/1416 726/25 |
| 2016/0006749 A1* | 1/2016 | Cohen | H04L 63/1408 726/23 |
| 2016/0021139 A1* | 1/2016 | Stephan | H04L 63/1425 726/1 |
| 2016/0072836 A1* | 3/2016 | Hadden | H04L 63/1416 726/23 |
| 2016/0112445 A1* | 4/2016 | Abramowitz | H04L 63/1466 726/23 |
| 2016/0127407 A1* | 5/2016 | Mankovskii | G06F 21/577 726/1 |
| 2016/0156655 A1* | 6/2016 | Lotem | H04L 63/145 726/23 |
| 2016/0164890 A1* | 6/2016 | Haugsnes | G06F 16/24575 726/23 |
| 2016/0164906 A1* | 6/2016 | Pinney Wood | H04L 63/1433 726/25 |
| 2016/0173521 A1* | 6/2016 | Yampolskiy | H04L 61/4511 726/25 |
| 2016/0197933 A1* | 7/2016 | Lapidous | H04L 63/0272 726/26 |
| 2016/0212165 A1* | 7/2016 | Singla | G06F 21/577 |
| 2016/0248797 A1* | 8/2016 | Yampolskiy | H04L 61/25 |
| 2016/0359895 A1* | 12/2016 | Chiu | H04L 63/1425 |
| 2016/0366174 A1* | 12/2016 | Chernin | H04L 63/1441 |
| 2017/0013014 A1* | 1/2017 | Foster | H04L 67/02 |
| 2017/0032130 A1* | 2/2017 | Joseph Durairaj | H04L 41/16 |
| 2017/0034023 A1* | 2/2017 | Nickolov | H04L 43/0817 |
| 2017/0048270 A1* | 2/2017 | Boyadjiev | H04L 12/44 |
| 2017/0061132 A1* | 3/2017 | Hovor | H04L 63/1433 |
| 2017/0063901 A1* | 3/2017 | Muddu | H04L 43/08 |
| 2017/0063905 A1* | 3/2017 | Muddu | H05K 999/99 |
| 2017/0149818 A1* | 5/2017 | Hillis | H04L 63/1441 |
| 2017/0244746 A1* | 8/2017 | Hawthorn | G06F 21/55 |
| 2018/0337958 A1* | 11/2018 | Nagarkar | H04L 63/20 |
| 2020/0067861 A1* | 2/2020 | Leddy | G06F 16/6245 |
| 2020/0082098 A1* | 3/2020 | Gil | G06F 21/577 |

OTHER PUBLICATIONS

Extended European Search Report for European Application No. 16816843.3 dated Sep. 15, 2020, 7 pgs.

* cited by examiner

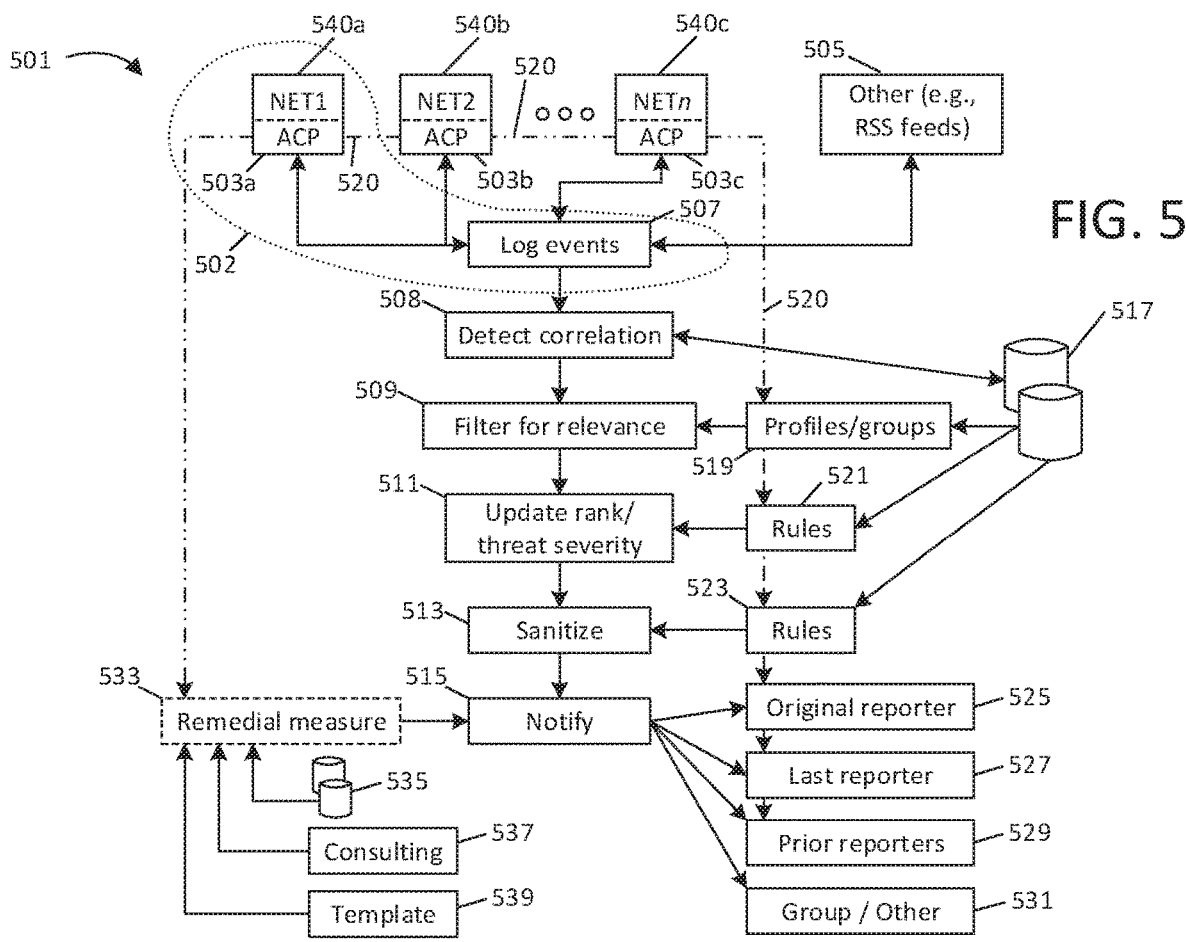

COMPUTER NETWORK THREAT ASSESSMENT

CROSS-REFERENCE TO RELATED APPLICATION(S)

This application claims the benefit of and is a continuation of U.S. patent application Ser. No. 15/373,662 filed Dec. 9, 2016, entitled "COMPUTER NETWORK THREAT ASSESSMENT", which claims priority to U.S. Provisional Application No. 62/266,435, filed Dec. 11, 2015, the entire contents of which are hereby incorporated by reference in its entirety.

TECHNICAL FIELD

This disclosure relates in general to computer network assessment.

BACKGROUND

Private networks may be at risk to directed attacks that attempt to overwhelm services, discover passwords and other valuable information, and otherwise misuse private network resources. Such attacks may often be targeted at specific networks and take the form of attacks that attempt to install malicious software (e.g., software that attempts to corrupt systems, steal information or create denial of service issues), or that otherwise attempt to cause crashes or network damage. Attacks often follow a common pattern, such as in a manner tied to source identity, target identity or attack type.

SUMMARY

In a first aspect, a non-transitory computer-readable storage medium is provided for storing instructions that, when executed by a processor, facilitate performance of operations for aggregating computer network threat information from multiple networks to enhance computer network security. The operations include, receiving from client networks respective threat data and storing the respective threat data in a security event database. The operations include, maintaining affiliations for groups, where the affiliation for a group associates the group with a subset of the client networks. The operations include, processing content in the security event database to detect correlation between a first network threat and a first one of the groups. The operations include, identifying at least one indicator associated with the first network threat. The operations include, dependent on the affiliation for the first one of the groups, identifying at least one of the client networks and generating at least one message, which conveys an alert to the at least one of the client networks, comprising the at least one indicator. The operations include, responsive to the at least one message, receiving, from the at least one of the client networks, a report of detected correlation between the at least one indicator and security event data maintained by the at least one of the client networks. The operations include, updating the security event database responsive to the report of detected correlation between the at least one indicator and the security event data maintained by the at least one client network.

In a second aspect, a method is provided for aggregating computer network threat information from multiple networks to enhance computer network security. The method includes receiving from client networks respective threat data and storing the respective threat data in a security event database. The method includes processing content in the security event database to detect correlation between a first network threat and a first group associated with a subset of the client networks. The method includes identifying at least one indicator associated with the first network threat. The method includes identifying at least one of the client networks and generating at least one message, which conveys an alert to the at least one of the client networks, comprising the at least one indicator. The method includes responsive to the at least one message, receiving, from the at least one of the client networks, a report of detected correlation between the at least one indicator and security event data maintained by the at least one of the client networks. The method includes updating the security event database responsive to the report of detected correlation between the at least one indicator and the security event data maintained by the at least one client network.

In a third aspect, a system is provided for aggregating computer network threat information from multiple networks to enhance computer network security. The system includes a memory, a processor, and a network interface. The memory includes instructions executable by the processor to receive, via the network interface, respective threat data from client networks; store data based on the respective threat data in computer-readable storage as part of a security event database; update a threat score corresponding to a first network threat represented by the respective threat data, the update performed to change the threat score as threat data is received from the client networks dependent on correlation of the first network threat with the respective threat data; maintain affiliations for groups, where the affiliation for a group associates the group with a subset of the client networks; detect correlation between the first network threat and a first one of the groups; and, dependent on the affiliation for the first one of the groups, identify at least one of the client networks and generate at least one message for the at least one of the client networks to convey to the least one of the client networks at least one indicator associated with the first network threat.

In a fourth aspect, a non-transitory computer-readable storage medium is provided for storing instructions that, when executed by a processor, facilitate performance of operations for aggregating computer network threat information from multiple networks to enhance computer network security. The operations include, receiving, from a hub, a message, which conveys an alert, that includes an indicator associated with a first network threat. The operations include, responsive to the alert, initiating a search at a client network to detect correlation between the indicator and security event data maintained by the client network. The operations include, transmitting a report of detected correlation between the indicator and the client network to the hub.

In a fifth aspect, a system includes means for receiving respective threat data from client networks, means for storing data based on the respective threat data in computer-readable storage as part of a security event database; means for updating a threat score corresponding to a first network threat represented by the respective threat data, the update performed to change the threat score as threat data is received from the client networks dependent on correlation of the first network threat with the respective threat data; means for maintaining affiliations for groups, where the affiliation for a group associates the group with a subset of the client networks; means for detecting correlation between the first network threat and a first one of the groups; and means for, dependent on the affiliation for the first one of the groups, identifying at least one of the client networks and generating at least one message for the at least one of the client networks to convey to the least one of the client networks at least one indicator associated with the first network threat.

These and other aspects of this disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

FIG. 5 is a block diagram relating to provision of services based on aggregated security events.

FIG. 6A shows an example of a client profile.

FIG. 7A shows an example of a sentinel or automated client portal (ACP) used in one embodiment.

DETAILED DESCRIPTION

Figure 1:
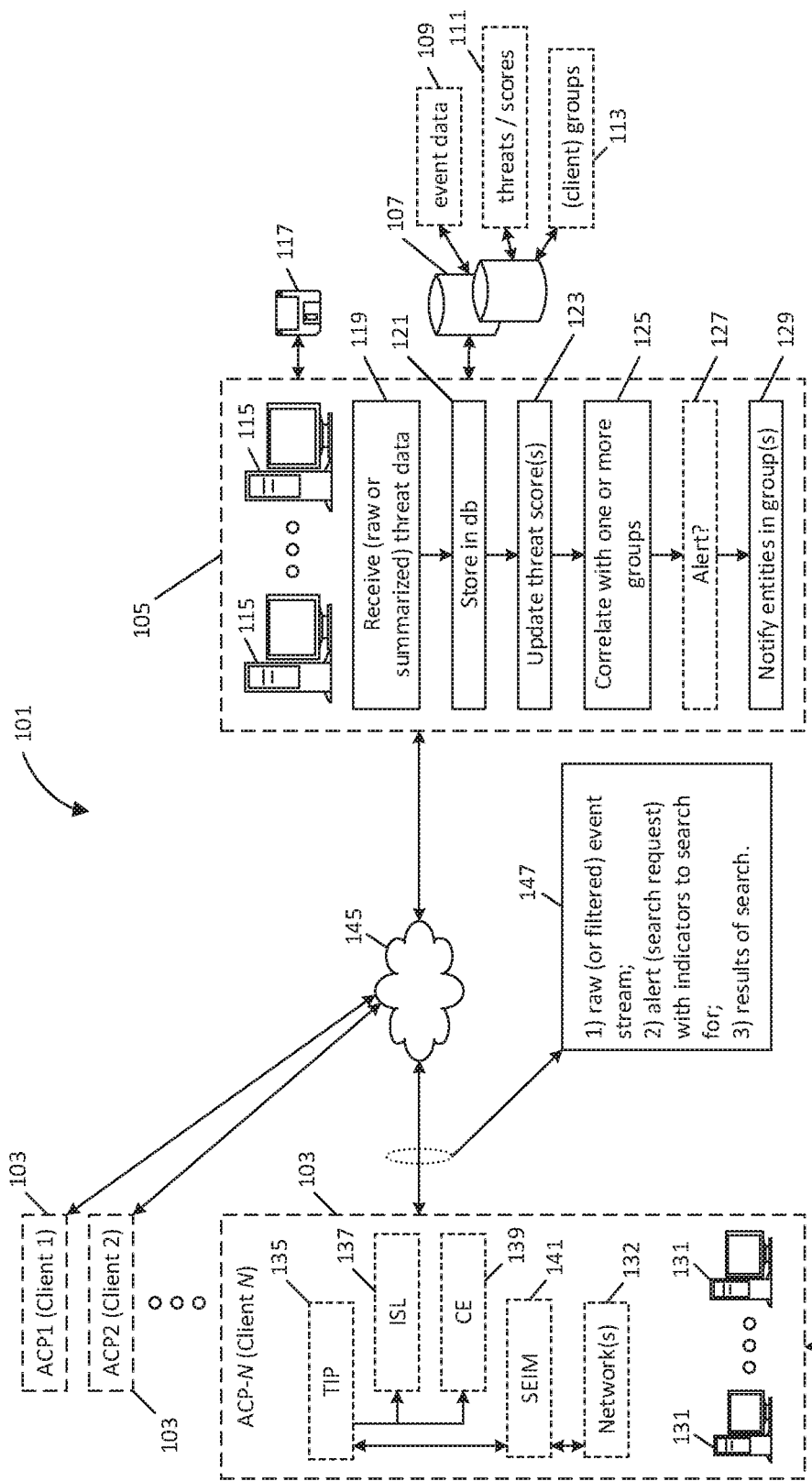
FIG. 1 is an illustrative diagram related to components of a security event aggregation service; the left-hand side of FIG. 1 shows a number of clients each having a sentinel or automated client portal (ACP), with internal structure of one client (client N 103) shown in expanded detail. The right-hand side of FIG. 1 shows functions associated with a security event aggregator (or hub).

A private computer network that is connected to a wide area network (e.g., the Internet) often faces a persistent assault by network security threats (e.g., cyber-attacks) that continue to evolve. The operator of such a private network can select from an ever increasing number of computer network security products offered by various software vendors to try to mitigate their exposure to network security threats. These products and related software and definitional updates (e.g., virus definition updates) may be provided in a manner to attempt to keep pace with evolving new network security threats.

Despite the sophistication of these network security products, protocols for sharing relevant threat information are generally limited. For example, network operators may be reluctant to share information that reveals information about their networks and their vulnerabilities. As an example, it is not uncommon for sources of threats (e.g., hackers) to share techniques and follow logical patterns in attempting to discover and exploit weaknesses in specific networks (for example, the network of a specific company). By contrast, client networks such the specific company in this example are reluctant to share information which they feel may publicly expose, compromise, or reveal security vulnerabilities or otherwise draw attention to a particular entity, or encourage additional attacks. For example, an entity in a specific field or industry (e.g., online retailer) might not have the same exposure, or face the same type of attack, as entities in a different field or industry (e.g., defense contractor). As these issues suggest, there exists little in the way of systems or services that provide an ability to dynamically predict attacks based on previous attack patterns in a manner specific to industry, company, platform or geography.

Systems and methods described herein may address the problem of the persistent need for timely updated information regarding fast evolving network security threats that are endemic in a wide area network (e.g., the Internet). Network threat information is received from many different client networks and aggregated by a central hub. For example, information about a new threat may be correlated with a group of similar client networks that are serviced by the hub. The hub may then query one or more client networks in the potentially affected group of client networks, prompting the client networks to search for information in their own private data that may be relevant (e.g., correlated) to the new network threat and report their findings back to the hub. Information sent to the hub may be sanitized to remove sensitive identifying information about a client network sharing information. Encryption schemes may also be used to further obscure the identity of a client network sharing information about a new network threat, while still providing the information that needs to be aggregated in order to alert client networks that may be potentially affected by the new network threat and in some cases to identify and/or automatically deploy mitigation measures (e.g., a firewall rule) for the new network threat. A quick response to new network threats enabled by information sharing among many client networks may decrease the exposure of the client networks to these new networks threats and enhance network security for the client networks, which may improve average performance and efficiency of the client networks (e.g., by increasing up-time). Further, sanitizing data and other measures to obscure the identity of a client network sharing network threat information may help to solve the problem of network administrator reluctance to sharing network threat information.

Implementations of this disclosure provide technological improvements particular to computer networks, for example, those concerning aggregating computer network security threat data from multiple client networks for analysis and sharing of information between client networks that may be targets of evolving malicious computer network security threats. Computer network-specific technological problems, such as difficulty tracking and adapting to evolving network security threats and risks of sharing sensitive network information (e.g., IP addresses), can be wholly or partially solved by implementations of this disclosure. For example, information about evolving network security threats that may be maintained and updated in a central database by a security event aggregation service by querying many client networks to gather information via secure and sanitized communications. Implementations of this disclosure can thus introduce new and efficient improvements in the ways in which network threat information is shared among client networks by automating analysis and updating of network security threat information based on information aggregated from many client networks to track fast evolving network security threats and enhance network security for the client networks collectively. Some implementations may for provide for effective cooperation between similarly-situated entities, and provide actionable information that can be used to anticipate, detect and thwart attacks.

This disclosure provides techniques for providing services based on pooled security event data. Generally speaking, these techniques can be embodied in the form of a central aggregator or hub and/or one or more client networks, each in the form of novel methods, software, machines or systems.

One embodiment provides a system or components of a system for centrally aggregating security event data, identifying indicators of possible future attacks (e.g., unknown attacks in-progress or that have not yet actually transpired) and attempting to evaluate possible threats by automated interaction with various client networks. Note that the terms client and client network as referred to herein refers to any entity having a network that either contributes data for central aggregation (or for threat analysis), or that otherwise is the possible target of a threat; for example, a client or client network can be an entity that reports security event data, and it can also be an entity that receives a message indicating that it may be subject to a network security threat or is requested to perform a local search to identify the presence of specified threats. This embodiment can feature methods, software, machines or systems that perform aggregation and interact with remote client networks, and conversely, it can feature methods, software, machines or systems that sit on client networks and interface with the aggregation service. Note that it should be clearly understood through this disclosure that security events and threat data might or might not represent a true threat, i.e., rather it is data representing a network event (e.g., network operation or network access) that might be benign or that might represent malicious activity (e.g., an actual or true threat).

In one implementation, this first embodiment takes the form of an apparatus comprising instructions stored on non-transitory machine-readable media, i.e., software. The software includes first instructions that perform functions associated with the aggregator or hub. For example, these instructions may cause one or more machines associated with the hub to receive network data from various client networks (i.e., any collection of diverse networks). This data collectively represents unknown security threats and is referred to broadly as threat data, with each entity reporting threat data respective to its network(s). The threat data can include any type of data regarding network access, for example, an IP address, a domain name, a file name or other information. The threat data can be provided in n raw or in summarized, processed or filtered form. This data is stored by the hub in a security event database. The hub also maintains stored affiliations between various client networks, i.e., linking them together as groups. This information is used to correlate attacks, identify net threat indicators, and provide actionable information to specific entities (i.e., networks) regarding possible attack. That is, the first instructions cause the one or more machines of the hub to detect correlation between a specific network threat and a specific one of the groups, and to identify at least one indicator of the specific network threat. Dependent on membership in the identified, specific one of the groups (i.e., depending on the stored affiliations for that group) the hub formulates message(s) to convey an alert (e.g., including the indicator) to one or more of the client networks in the group. The term alert as used herein merely denotes that a message is to convey to a client threat information or information regarding a possible threat, where it is anticipated the client will take some sort of action, e.g., search for presence of the threat, optionally configure networks to mitigate the threat, report information on-hand, and so forth. Note that the client networks in the group do not have to overlap at all with the entities that reported threat data giving rise to an alert or set of messages; for example, the described software can identify a group (e.g., point-of-purchase retailers) as a possible target of an attack reported by a completely different set of entities (on-line retailers). Additional examples of this will be provided further below. The software also comprises second instructions associated with a recipient entity (i.e. a client network that receives these messages). The second instructions cause at least one machine in the client network to receive the alert (i.e., the messages form the hub), and responsively initiate a search at that network to detect presence of (i.e., correlation of) the at least one indicator and security event data locally maintained by the network. These second instructions at the recipient entity's network then cause that network to report detected correlation back to the aggregation service. The first instructions then cause that service to update the security event database responsive to results of the remotely initiated search.

A second embodiment provides a system or components of a system for centrally aggregating security event data, generating and updating scores of various threats and, responsive to the maintained scores, sending messages to one or more clients networks in a group that is the possible target of associated threats. The messages can request local search by client networks receiving the messages, and they can also optionally convey remedial measures (e.g., firewall rules adapted for automatic machine instantiation), messages to administrators, threat scores and other types of information based on pooled security event data.

Here again, this second embodiment can take the form of methods, software, machines or systems that perform functions of the hub, or that sit on client networks, or both.

By providing for automated threat prediction services and mechanisms for searching client networks for the presence of specific threat indicators, the disclosed techniques provide unprecedented capabilities for (a) collecting and processing security event data from disparate networks, (b) identifying patterns or trends, including forecast of specific attacks on specific entities (i.e., specific client networks), or groups thereof, and (c) collecting and integrating information from those entities to confirm attacks in real time or obtain additional, actionable information that can be used to update threat level and identify, prevent and mitigate attacks.

It was earlier noted that one difficulty in aggregating data stems from computer networks (e.g., client networks) being configured to conceal (rather than distribute) network threat data, because such information might publicly expose compromise, reveal security vulnerabilities or otherwise draw attention to a particular entity or encourage additional attacks. To address these issues, various techniques and systems discussed below provide for automatic (or configured) sanitization of reported data, and aggregation that is based on anonymity, while at the same time permitting correlation of threat information with specific groups of client networks. Such techniques provide for a framework that inhibits interception and/or use of reported data in a manner detrimental to the reporting client, but also in a manner that can be used to limit data aggregation to specific, known entities in a secure manner. Optionally combined with the various techniques discussed earlier, this provides a powerful tool to facilitate the pooling of network threat data from client networks that might otherwise be reluctant to share that data, and so, further enhances the availability of robust, actionable information that can be used to prevent and/or mitigate attacks.

Note that it was earlier mentioned that various embodiments can be embodied as instructions stored on non-transitory machine-readable media. These embodiments, or various components thereof, can also be variously embodied in the form of machines, circuits (or circuitry), logic, engines or modules. Circuitry can refer to logic gates, arranged so as to necessarily perform a certain function, or as multi-purpose circuitry (e.g., a processor, FPGA or other configurable circuits) that are controlled or configured by instructions to adapt that circuitry to perform a specific function. In the case of software or other instructional logic, the instructions are typically written or designed in a manner that has certain structure (architectural features) such that, when those instructions are ultimately executed, they cause the one or more multi-purpose circuitry or hardware (e.g., one or more processors) to necessarily perform certain described tasks. Logic can take the form of hardware logic and/or instructional logic (e.g., software). An engine refers to instructional logic that performs a dedicated function, e.g., a correlation engine refers to code that with supporting hardware continually or repeatedly performs correlation of data under the auspices of control software. Modules as used herein refers to a dedicated set of instructions or code stored on non-transitory machine-readable; for example, a first module to perform a first specific function and a second module to perform a second specific function refer to mutually-exclusive code sets. Non-transitory machine-readable media means any tangible (i.e., physical) storage medium, irrespective of how data on that medium is stored, including without limitation, random access memory, hard disk memory, optical memory, a floppy disk or CD, server storage, volatile memory, memory card and/or other tangible mechanisms where instructions may subsequently be retrieved by a machine. The machine-readable media can be in standalone form (e.g., a program disk, whether bootable or executable or otherwise) or embodied as part of a larger mechanism, for example, a laptop computer, portable or mobile device, server, data center, blade device, subsystem, electronics card, storage device, network, or other set of one or more other forms of devices. The instructions can be implemented in different formats, for example, as metadata that when called is effective to invoke a certain action, as Java code or scripting, as code written in a specific programming language (e.g., as C++ code), as a processor-specific instruction set, or in some other form; the instructions can also be executed by the same processor or common circuits, or by different processors or circuits, depending on embodiment. For example, in one implementation, instructions on non-transitory machine-readable media can be executed by a single computer and, in other cases as noted, can be stored and/or executed on a distributed basis, e.g., using one or more servers, web clients, storage devices, application-specific or other devices, whether collocated or remote from each other. Each function mentioned in the disclosure or FIGS. 1-9B can be implemented as part of a combined program (e.g., with instructions or code portions that are potentially shared with other functions) or as a standalone module unless otherwise indicated, either stored together on a single media expression (e.g., single floppy disk) or on multiple, separate storage devices. The same is also true for a circuitry, e.g., circuitry for performing a first function and circuitry for performing a second function can have shared circuitry elements. Throughout this disclosure, various processes will be described, any of which can generally be implemented as instructional logic (instructions stored on non-transitory machine-readable media), as hardware logic, or as a combination of these things.

In the discussion above and that follows below, various embodiments will be described, each having associated technical detail. It is expressly contemplated that various features of these embodiments can be mixed and matched by one having ordinary skill in the technology to which this disclosure pertains. Thus, if a first embodiment is described as having a first technical feature, it should be clearly understood that generally, this disclosure expressly contemplates that such first technical feature can be also implemented with a second embodiment, even if such detail is not specifically repeated in the context of the second embodiment. The same is also true of technical features of the various embodiments provided by the patents and patent publications which have been incorporated by reference.

FIG. 1 shows one detailed implementation of some of the principles set forth herein. This implementation is generally designated using reference numeral 101. More specifically, numeral 101 identifies a distributed set of networks each having special purpose machines and/or instructional logic running on multi-purpose machines that take specific actions relative to these various networks.

Numeral 103 identifies a plurality of client networks, such as client 1, client 2 . . . client N and so forth. These clients can be any entity associated with one or more private networks, for example, a governmental entity, a school, a private company, and so forth. It will be assumed for purposes of this discussion that each of these networks is a private company, though of course, this embodiment is not so limited. Client 1 for example might be a credit card company, client 2 might be a bank, and client N might be a point-of-sale retailer that accepts credit card payments and otherwise uses a network of digital machines to manage its operations. Generally speaking, each client network will have multiple such machines, some type of gateway for connecting to other networks (e.g., the Internet), and appropriate security systems, for example, including machines that implement firewall protocols and that log or otherwise regulate network communications. A client network can include a hierarchy of many such networks, for example, a network for each of a set of diverse client sites, with tunnels optionally connecting those networks. Many different configurations are possible. Each client network in this example includes a sentinel or automated client portal (ACP), the purpose of which is to interact with pooled network security services. In a contemplated variation, the ACPs can also interact with each other on a peer-to-peer basis or on an otherwise distributed basis (e.g., where queries and responses are exchanged with each other via the centralized, pooled network security services).

The central hub 105 may be an aggregator of security event data reported by the various clients. As introduced earlier, this aggregator receives and stores security event data (i.e., respective threat data from the various client networks) and performs automated correlation of this data using software to detect patterns of attack, predict future attacks, and responsively take action. Note that a client network as mentioned previously can be a source of many different types of sources of threat data, e.g., including RSS feeds from government and/or public or private sources, and/or other sources of threat data. For example, one source of such threat data can be security event data, for example, consisting of IP addresses (or other information, such as identities, domain names, file attachments) of all traffic that are parties to communication with a particular client network. In a different example, a particular client network might be supported by an internal information security group that establishes firewall rules and other configurations, so as to protect the network by, for example, blocking traffic with certain IP addresses; the network data reported by such a network can be filtered so for example only to report attempted accesses with blocked parties, or to report information for entities that fail password login attempts. Indeed, nearly any type of data representing network events can be passed along as threat data (i.e., many of these events being legitimate, with the hub or aggregator using a scoring mechanism to evaluate whether specific data represents a real danger).

To provide a first very simple example of correlation processing and responsive action that can be performed, if Client 1 and Client 2 were to see three threats in succession, Threat A, Threat B and Threat C, the aggregator might predict that Client N would also be subject to these same three attacks, and so could alert Client N to this fact. As will be explained below, in some embodiments, the aggregator can dynamically interact with each client network's ACP to perform automated searching relating to this prediction—for example, the aggregator in such an embodiment instructs Client N's ACP to search for indicators associated with each of Threat A, Threat B and Threat C, and if the result of search showed that Threat A and Threat B but not Threat C had been already encountered, this result could be used to (a) upgrade the perceived severity of any of Threat A, Threat B, and Threat C (e.g., using scoring as introduced above) and (b) implement prophylactic measures (e.g., such as a firewall rule, or malicious software removal tool, or other measure) to configure Client N's systems to resist Threat C, even though this threat had not yet been encountered. Again, these features and some more complex examples will be discussed further below. Note again that the described system can in large part, be implemented under auspices of software, e.g., as code on each client's network that implements functionality of the ACP at the respective client network, and as code at the aggregator that implements the functions of the hub.

A typical but exemplary client network configuration is exemplified with reference to client N, which is shown in expanded detail in FIG. 1. Every other client network can have the same or a different configuration. It is once again assumed that this client is a POS-retailer that has many digital machines 131, arranged as one or more networks 132. These machines interact with an external network, for example, the Internet (generally represented by numeral 145), for example, to perform transactions (or other types of communication). Such networks could the subject of external attack, as referenced earlier and, to this effect, the client network includes a number of machines including a threat information processor 135 (TIP), and a security event incident management system 141 (SEIM). The client network also includes two other security system elements, including interaction support logic 137 (ISL) and a correlation engine 139 (CE). The ACP can further include the TIP, the ISL and the CE or components thereof; more specifically, client N implements the ACP by downloading and/or installing code 133 that (a) provides for reporting threat data from client N's network(s) to the hub 105, (b) provides for interaction support in the form of selective query initiation (to the hub or other client networks), and associated query response, (c) communication regarding specific threats, for example, exchange of threat scores, requests for localized search for specific threats (i.e., a form of query response from the hub or other clients), and instantiation of remedial measures, and (d) an application programming interface (API) for an administrator of client N's networks to configure the ACP, information sharing, group memberships, chat functions and other operations. For example, the ACP in one embodiment permits each client network's administrator to select a level of filtering to be applied for reported security event data (i.e., automatically reported, respective threat data), establish preferences for trusted circle memberships, establish a profile for the particular client (i.e., used by the hub to configure services), customize whether remedial measures and searches are to be automatically implemented responsive to hub requests (or require local administrator notification and approval on an individualized basis), and other management functions. Note that extensive discussion of query functions and support can be found in the patents and patent publications which have been incorporated by reference above, including the use of different query types and enforced response times, including peer-to-peer chat and query support functions; these functions will not be extensively discussed below, other than as relates to interaction with the hub. The ACP, and its associated components, provide for each client network to stream respective threat data to the hub (in a manner that will be used to provide pooled security event services to the client which reported the data, or to others), and to receive and respond to messages (including alerts) from the hub related to threat prediction and threat ranking (see box 147).

Functions associated with the aggregator or hub 105 are seen at the right side of FIG. 1.

First, note that the hub interacts with a security event database 107, e.g., used for storage of threat data (security event data 109) reported by the respective clients, and also used for storage of data and management of databases as will be discussed further below. This database 107 can either be a part of the hub 105 or can be remote from the hub, for example, part of a remote datacenter or inside of another network or other networks. As noted in FIG. 1, the database is also used to track specific threats and associated scores 111 in support of correlation processing performed by the hub and the various clients, and also to manage client information including client profiles, group memberships (affiliations) and so forth, collectively represented by numeral 113.

The hub 105 is generally configured as a network having one or more machines 115 driven under auspices of software 117. These machines can implement traditional network functions such as gateway support and security, provide correlation support and threat forecasting support, storage of managed data in mass storage (e.g., as part of the hub or remote thereto as mentioned above), billing, communication support of clients, and other functions. More specifically, the hub receives raw or summarized threat data (security event data) from the respective clients, per numeral 119, it stores this data in the database 121, it correlates threats and patterns of threats and updates 123 scores for threats (to be discussed further below), it correlates threats with one or more groups of clients, per numeral 125), it selectively generates 127 alerts (e.g., forecasts), and it alerts entities in the identified group(s), per numeral 129. As noted earlier, if an alert is generated, it can be sent to another entity, for example, even an entity with which the hub has no a priori relationship; for example, a threat reported by client N can be used to send a message to a different retailer with which the hub has no relationship, said different retailer also being a client network pursuant to the discussion above. As this narration makes clear, in one implementation, these features can be used to solicit new clients by providing clients with information on prospective threats and offering services for automated threat mitigation and/or response.

Some other, simplified examples will help introduce some capabilities of the described embodiment. Suppose that client N reports a threat—Threat B, in the form of data associated with a remote domain or specific IP address; the hub receives this data and correlates it with other, previously received event data 109 in the security event database 107, and determines that this threat is more prevalent than previously realized and raises its threat level to high. The hub can be configured to solicit new clients by identifying entities similarly situated to client N, by automatically generating messages for those new clients that conveys information about threat B, and that advertises that a subscription to services offered by the hub provides for automated threat mitigation and/or provision of measures design to thwart attacks before they are actually experienced by the new clients. In a variation, if it is determined that client N is part of a trusted circle (or other group) in common with client 2, and that threat B is correlated with this group, then the hub can be configured to send a message to client 2 (or other clients, which by virtue of group affiliation, are correlated with the threat with the high threat level) to alert them to the new threat. Alternatively, the hub (e.g., if supported by administrator configuration of the respective client) can send message to client 2 to initiate automated searching of client 2's networks or logged security data to enquire whether client 2 (by virtue of group affiliation) has seen the remote domain or specific IP address associated with threat B. Response to such a search/query can then be used to correlate threat B and/or take further actions. As these examples make clear, the dynamic cooperation provided by the hub and respective ACPs provide for a capability to dynamically correlate threats, predict threat patterns or targets responsive to this correlation, and take other actions based on actionable threat relevance.

Figure 2A:
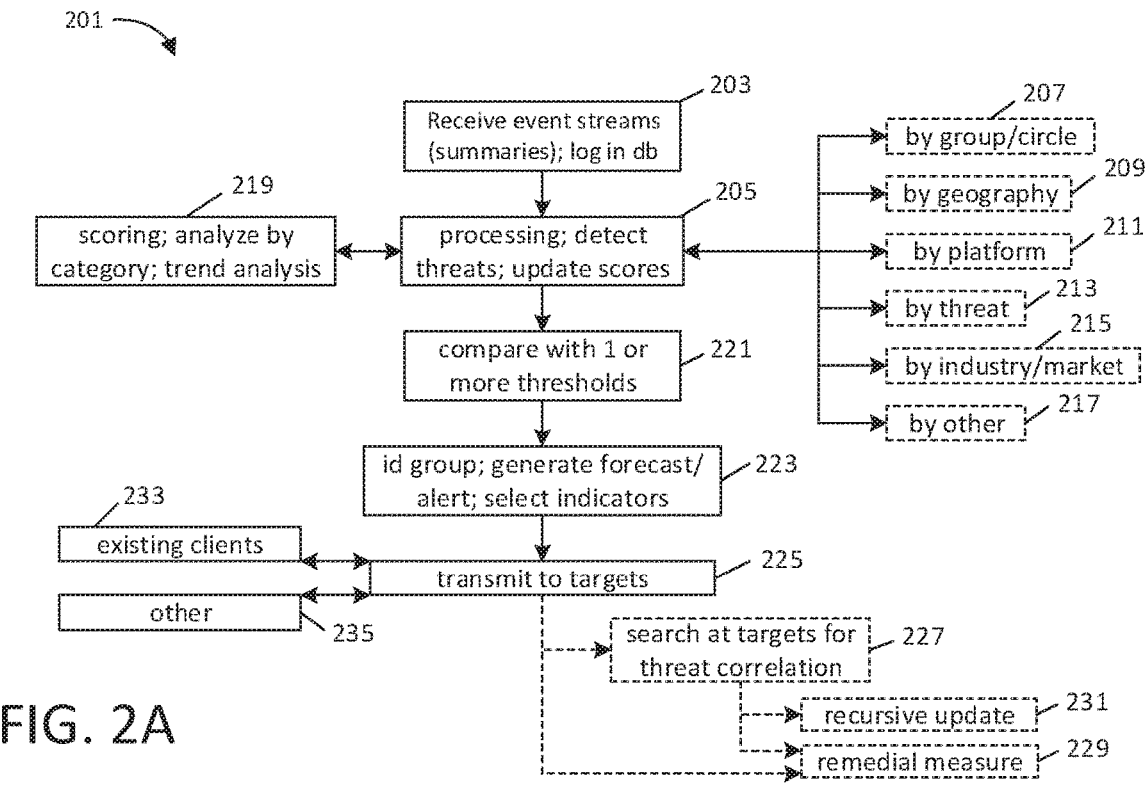
FIG. 2A is a block diagram that shows example functions associated with a security event aggregator or hub.

FIG. 2A is a block diagram that shows functions 201 that can be taken by a hub or aggregator in additional detail. Once again, any of these functions, or all of them, can be implemented by instructions stored on non-transitory machine-readable media that, when executed, cause one or more processors to necessarily operate in a specific way (i.e., to configure a multi-purpose machine such as a computer to operate as though it was a special purpose machine).

As denoted by numeral 203, one or more processors at the hub receives threat data reported by various client networks. This data is logged in a security event database in association with the entity that reported the specific threat data (or a group to which that entity belongs). Note as discussed earlier, in some embodiments, reported data is sanitized (at the source or by the hub) so that it does not identify the entity that actually reported the data; in these embodiments, indirect measures can be used by the hub to characterize the reported data by linking it to an entity known to the recipient, to a trusted circle or to another desired group, and this information can be stored with the logged data, or the logged data can be stored in a manner in which it is inherently associated with reporting entity or group. Trusted circles will be further discussed below. In yet another embodiment, the threat data is simply logged without any identification of client network or group.

As the threat data is received, or on a batched basis, one or more processors at the hub then process that data by attempting to match it against a database of known threats, that is, threats that have been identified and have scores tracked and associated with those threats. If a match is found, the hub then initiates one or more queries within the networks of members of pertinent trusted circles (or other groups associated with the entity reporting the threat) to determine whether the threat score should be revised based on the newly received data. In this regard, if no match is found among known threats, or dependent on the type of match that is found, the hub then attempts to correlate the newly arriving threat information with existing raw security data by crawling the security event database for logged events having data which matches some portion of data within the newly received threat data. This latter operation can similarly result in initiating one or more queries with trusted circles (or other groups associated with the entity reporting the threat). Perhaps otherwise stated, for newly arriving data, the hub checks to see whether this data corresponds to an already-recognized threat (having a score): if it does, then the hub performs further checks in the security event database and with or more targeted client networks to determine whether that score should be revised (and further actions taken); if it does not, then the hub attempts to correlate the newly arriving threat with the security event database to determine whether a new threat should be recognized and scored (and added to the threat database) and potentially prompt other (e.g., cooperative) processing. These various functions are represented generally by numeral 205 in FIG. 2A.

Note that the processors also attempt to correlate threat data with one or more groups of clients by attempting to correlate the threat data with the various groups. As earlier noted, a group in this context can consist of a trusted circle (essentially a social network of multiple clients that have an elective relationship) or any other grouping that matches similarities between clients, for example, based on operating platform, software used, geography in which the client or its site is located, based on receipt of similar previous threats, or other measures, all as represented variously by numerals 207, 209, 211, 213, 215 and 217. Any single grouping or combination of these groupings can be used, depending on embodiment. For example, in one possible implementation, a hub simply attempts to correlate threats with trusted circles representing affiliations with respective subsets of clients. In another implementation, there may be no elective trusted circles, but the hub might attempt to match industry and field of multiple clients and so transparently establish groups of clients based on perceived similar characteristics (e.g., based on information supplied by the client or stored at the hub as part of a client profile); for example, a group can explicitly be defined in such an embodiment by establishing a category (e.g., bank) and then storing affiliations between that category and each client network having profile information indicating that client network represents a bank. It could be that a threat—Threat C is seen with great incidence by client networks that are banks but with significantly less incidence by other types of entities. In this regard, per numeral 219, the hub can maintain threat scores for known threats that are general, or are separately computed and maintained for each category (e.g., each possible grouping). In one implementation, discussed further below, threat scores are actually product of two or more scores, for example, an enrichment score (representing static correlation of a threat with other data in the security event database) and a velocity score (representing whether the particular threat is trending up or down, e.g., for the specific grouping or category).

With correlation of specific groups identified, and threat scores updated based on the newly received data, the hub then compares the threat scores with one or more thresholds 221. The thresholds can represent any level (dynamic or static) that should be used to trigger further action. For example, with reference to an example introduced earlier, if a threat level for an identified threat was high and this level matches a predefined threshold (e.g., threat level=high), the hub would deem the specified threshold(s) met and would take additional actions (discussed below), as specified by one or more preconfigured rules; otherwise the specific action would not be taken. Many variations of this basic example are possible, and notably, the threshold analysis can be made much more complex than this simple example indicates. For example, one implementation can retrieve separate enrichment and velocity scores for a group following score update (e.g., for banks) and could take action if the enrichment score was determined to be greater than a specific value (e.g., if a numerical score for enrichment was greater than 78) and update to the velocity score resulted in an increase, e.g., v[n+1}>v[n]). Many tests and thresholds can be used, either in a manner that is consistent for each group, or with specific rules for specific groups. The selection and design of suitable rules is believed to be within the level of ordinary skill of one familiar with information security, and will vary dependent on implementation and client. In general, it is considered useful to use rules which will prompt further action if the newly arriving threat data, and resultant score update, indicates an increased, minimum risk level relative to any particular group. As indicated by FIG. 2A and numerals 223 and 225, the action taken responsive to threshold comparison (221) can include identifying one or more client networks in a selected group or group(s), identifying indicators associated with the threat at-issue, and transmitting messages to those identified networks (target networks). Such messages can alert the target networks as to increased threat risk (as applied to that target network) and can request a local search of the particular client network (227) or provide a remedial measure (229). In this regard, numeral 231 indicates that, optionally, one measure that can be taken responsive to an increase in score is a recursive analysis that specifies threat indicators (i.e., associated with a threat tied to a score increase) and requires local-client search for correlation of the indicators. Again, such a request can be sent to the entity reporting the threat data, or to one or more entities in a selected group. The request calls for each addressed client to obtain its own threat measure local to the respective client, and then these threat measure are reconciled with the score(s) maintained by the hub. For example, consider a situation where a client bank a reports data that is linked to known threat A and this then produces an increased threat score that causes the hub to request all clients which are banks to also search for indicators of threat A. As clients receiving such an alert respond with the results of search, this can then cause the hub to further adjust its threat level, potentially causing the update to meet additional thresholds and take further actions (such as providing remedial measures, per numeral 229). Numeral 223 refers to an operation where the hub iteratively adjusts its score by cycles of dynamic interaction with one or more clients, each cycle potentially resulting in a score update. To restrict processing, the cycles (or updates) can be capped to a fixed number of iterations, or a hysteresis function can be applied, such that client feedback only results in a score change if a client computes a threat score different by a predetermined amount from other scores reported by clients or from the scores maintained by the hub. Many examples are possible. Numerals 233 and 235 indicate that the messages (e.g., conveying an alert or requesting action) can be sent to a one or more existing clients in a group, or other entities that are not existing clients (e.g., as introduced previously).

Figure 2B:
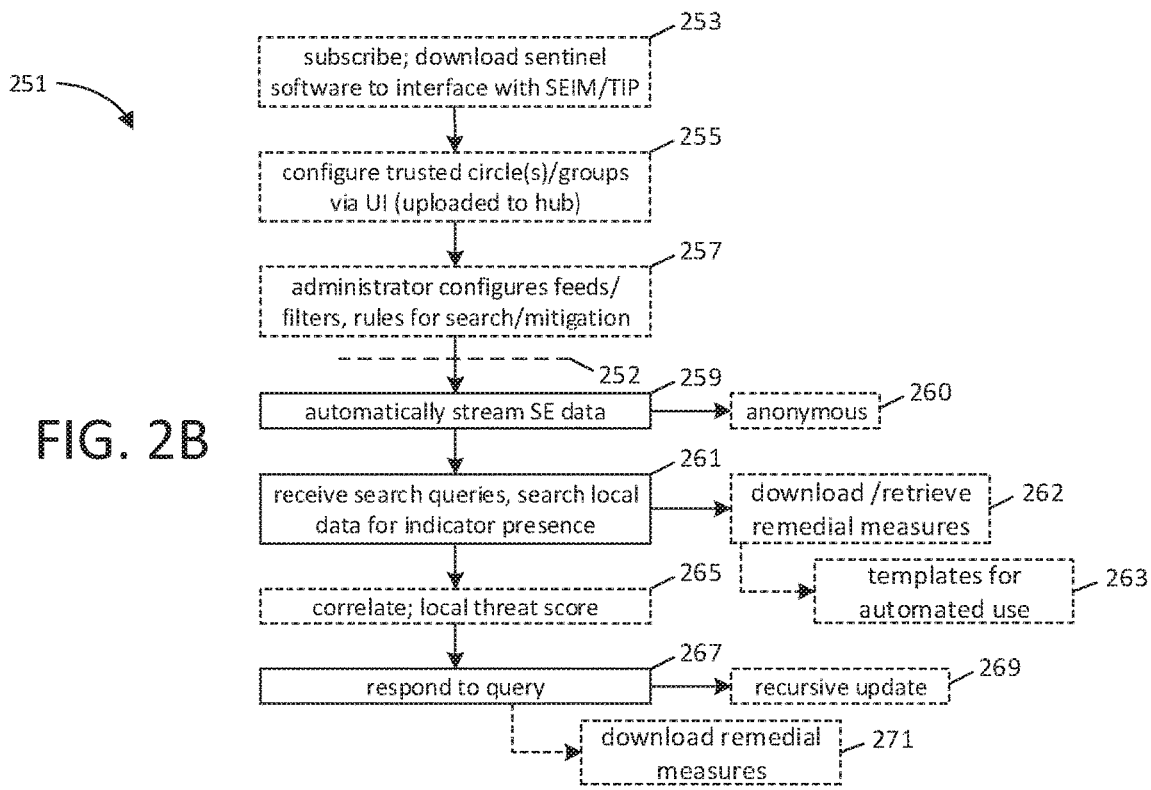
FIG. 2B is a block diagram that shows example functions associated with a sentinel or ACP.

FIG. 2B is a block diagram showing functions 251 that can be taken at an exemplary client portal, e.g., at a client ACP. Two sets of functions are indicated, including off-line (i.e., setup functions, above horizontal separation line 252) and run-time functions (i.e., below this same line). As indicated by numeral 253, a client network first subscribes to pooled security event services offered by the hub, and downloads or installs suitable software to interface between the client's networks and the hub (e.g., software that implements the ACP and otherwise provides these interface functions). In a variation, this software can be bundled with hardware and made available as a dedicated network machine or system, or it can take the form of software adapted for retrofit to an existing TIP or SEIM system in order to provide the ACP functions. Note that as part of the subscription process, the ACP typically identifies or installs a cryptographic tool that will be used to provide for secure (i.e., encrypted and/or authenticated) information exchange with the hub and, typically, a key is registered with the hub that will permit the hub to perform corresponding encryption and decryption functions. Per numeral 255, this information is uploaded to (or downloaded from) the hub in association with a client profile together with other pertinent information, such as billing information and affiliations with elective trust circles that the client network's administrator wishes to establish. In one embodiment (as also discussed in the references incorporated by reference), an administrator can elective establish trust circles and use messaging to send links to administrators at other companies (e.g., of other networks) that invite those administrators to join a newly established trust circle. Each trust circle is essentially an elective social network among client networks (i.e., a subset of overall client networks subscribing to the hub) where the members of the trust circle wish to have an ability to query other circle members on a peer-to-peer basis, and establish affiliations that will be used to group like-situated entities together and otherwise establish a context for relevance. The client administrator also (257) locally configures feeds (to be provided to the hub based on locally-indexed data), establishes filters for the information to be provided, and establishes rules pertaining to local search and threat mitigation (e.g. firewall rule instantiation) communicated by messages from the hub; for example, one administrator might choose to permit automated searching (and rule instantiation) pursuant to the hub's messages, while another administrator might want to be alerted and have approval authority as a precondition for local system response (e.g., an administrator clicks OK in order for a hub-initiated action to proceed). Other protocols can clearly also be used.

During run time, the client ACP automatically streams security event data representing possible threats (threat data)

to the hub, per numeral 259. As indicated by numeral 260, this data is in one embodiment locally sanitized according to rules configured by the client administrator during the off-line (set-up) process. For example, as default, the ACP can be configured to accept a specification of any domain or IP address corresponding to the particular client network, and to automatically replace these with a wildcard for any data sent to the hub. Other types of sanitization can also be used, preferentially in one embodiment removing any information that links reported threat data to the particular client network reporting that data. Pursuant to numeral 261, the ACP can receive search queries (from other networks on a peer-to-peer basis, or from the central hub, for example responsive to the threshold processes just described), and can search locally-indexed security event data for the presence of any specified indicator. In one embodiment, the ACP interacts with the client's SEIM system using a common communication format that permits the ACP to interact with SEIMs from different manufacturers or using a custom API configured to work with the specific client's SEIM or other event indexing system. The ACP provides the administrator with an option to download (e.g., via push) or retrieve (pull) remedial measures (262) where those measures can take the form of templates (263) adapted for automatic machine adaptation and use, for example firewall rules that block certain destinations associated with a threat, or installs a malware removal tool, a new antivirus definition set, or other data. Optionally, the ACP provides for the correlation of hub identified threats with local data, and the computation and/or update of local threat scores for specific, known threats (265); as an example, in one implementation, the hub can initiate a localized search at the particular client network and request that the ACP of the client network score an indicated, possible threat, based on its own observations. Per numeral 267, the client network responsive to search (query) can then respond to the requestor, optionally by providing a locally-computed threat score, a set of locally-identified indicators, raw event data or other information. This information, once again, can (depending on embodiment) be optionally used to perform recursive update (269) (i.e., with the hub) or to download remedial measures to counteract specific threats revealed by local correlation of specific indicators (271).

Figure 2C:
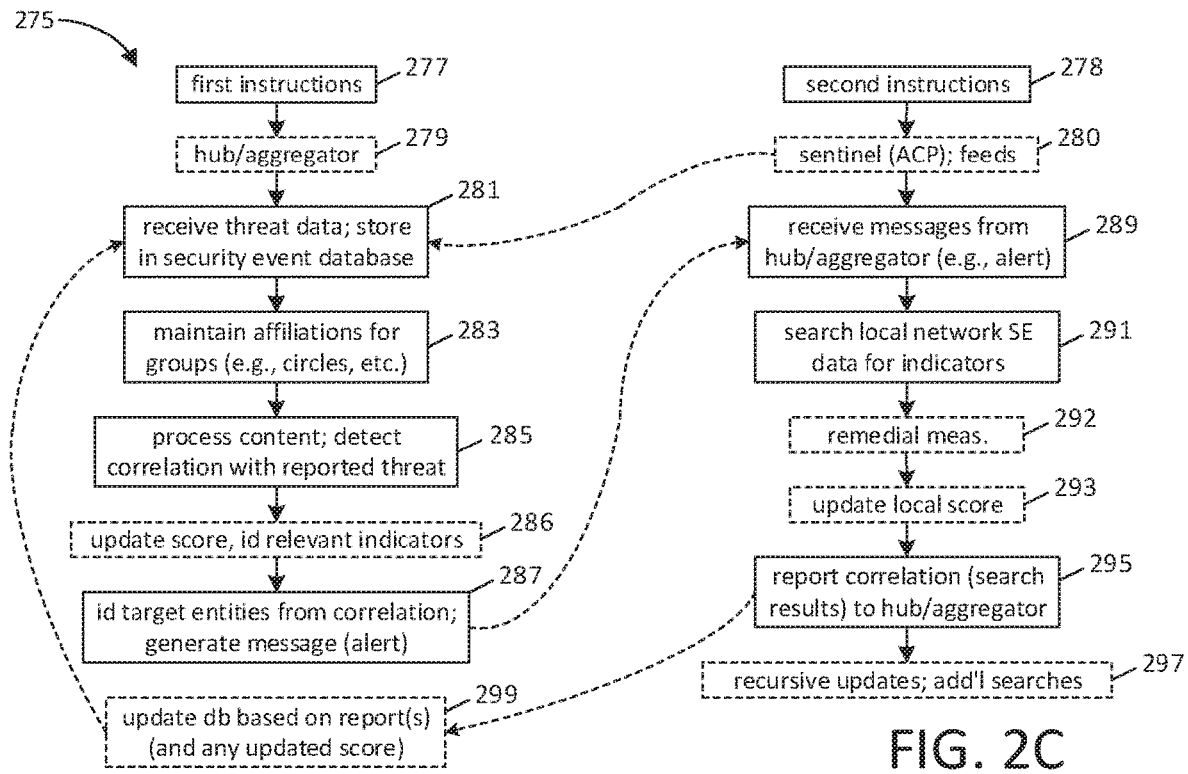
FIG. 2C is an illustrative diagram showing example software elements (i.e., first instructions 277 and second instructions 278) that can be used to perform functions introduced with reference to FIGS. 2A and 2B.

FIG. 2C is used to illustrate flow and interaction between a hub and client network in another embodiment (275) of a pooled security event service according to the techniques herein. First, note again that this embodiment can be embodied as first instructions, 277, second instructions, 278, or both the first and second instructions interacting together or downloaded from a common source. Per numeral 279, the first instructions can be executed by one or more machines in a hub, while per numeral 280, the second instructions can be embodied by one or more machines in a client sentinel or ACP.

As noted above, each client network is configured to report (e.g. stream) respective security event data (threat data) to the hub, and the hub is configured to store this received data in a security event database, as identified by the arrow connecting functions 280 and 281. This data exchange can be effectuated by a secure tunnel (e.g. VPN between the hub and a given client network, e.g., over the Internet) or otherwise by direct network exchange (e.g., TCP-based message exchange, in encrypted form, or in clear-text sanitized form with a cryptographic hash, or both). The hub, as noted earlier, maintains affiliations for various groups of client networks (e.g., trusted circles or other groups), per numeral 283, and it processes received threat information content to detect correlation between the threat information and one or more of the groups (285). As noted earlier, the hub (optionally in this embodiment) can also score threats and update threat scores responsive to the newly received data and/or the identified correlation. Responsive to the correlation between threat and one or more of the groups, the hub selects one or more indicators associated with the identified threat (286). The hub then selects (identifies) one or more target entities dependent on the correlation with groups and affiliations associated with any identified group, and it generates one or more messages (e.g., as an alert) to relay threat information to the identified target entities (287). For example, the hub can identify a specific set of client networks as target entities (e.g., banks) and it can, responsive to correlation of a threat as being pertinent to banks, formulate messages that it will transmit to each client network that the hub's stored affiliations indicate is a member of the group banks. The messages can alert the identified target entities (and or entire identified group(s)) as to a specific threat and can pass the one or more indicators of the threat to those target entities for monitoring, mitigation or search purposes. Any given client network's ACP can receive such messages from the hub if that network is identified by the hub as a target entity to receive a particular message or set of messages, per numeral 289 and the flow arrow that connects to function box 287. Thus, each client networks ACP streams data to the hub for logging and then receives select messages from the hub that are specific to threats associated with that particular client, or for which local searching is requested. Per numeral 291, in response to such a request from the hub, the client performs local security event data searching such as by examining specific access records, looking for specific files (e.g., malware) and so forth. The particular client network can also selectively implement remedial measures (292), either in the form of measures provided as part of the messages from the hub, or separately retrieved from the hub, or locally scripted and invoked, and it can also locally compute a threat score for a specified threat, either automatically or upon hub request, depending on embodiment (293). Once local searching (and any scoring called for by the hub) is complete, the client ACP reports (295) the results of its search to the hub, which then in turn updates its security event database (e.g., logged event data or scores for known threats), per numeral 299. The hub then awaits the next quantum of threat data (i.e., as indicated by a flow arrow connecting functions 281 and 299) or otherwise continues with other processing. The client may also additional searches and/or recursive updates of its local database (297).

Note that many implementation variations are possible without departing from the basic techniques described above. To cite one non-limiting example, instead of having a client network locally score a threat, the hub can convey its score as part of the message(s) transmitted to that client network, and the client network can be called upon to respond in a manner dependent on the provided score. For example, the client network in such an embodiment can be configured to respond with search results only if it finds a level of correlation for an indicator that exceeds a level indicated by the hub's score. Choice of a suitable scoring mechanism and rules for automating the collaborative exchange between client network and hub can be tailored depending on implementation and clients at issue. Also, while many of the examples above have cited the use of banks, the described principles can be applied to any collection of private networks (i.e., client networks), even to multiple networks owned (i.e., controlled) by a single entity.

Figure 3A:
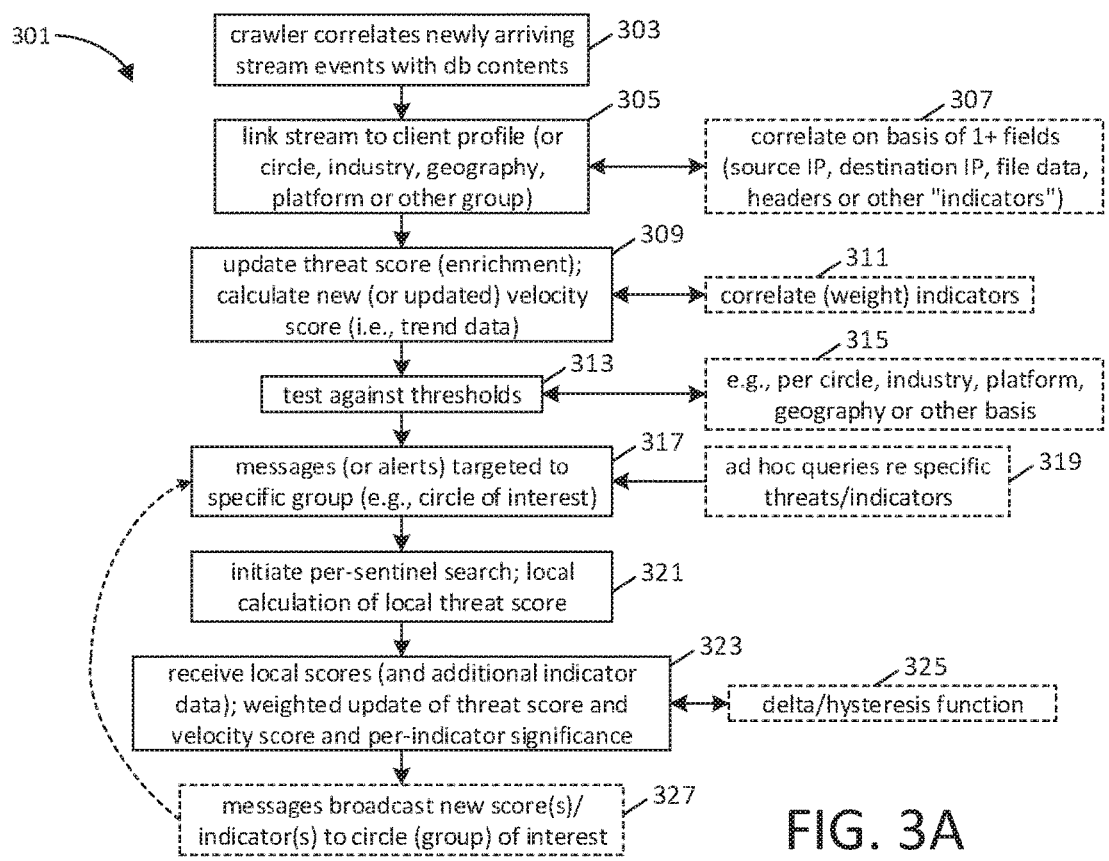
FIG. 3A is a block diagram that shows example functions associated with scoring of threats in one embodiment of an aggregator.
Figure 3B:
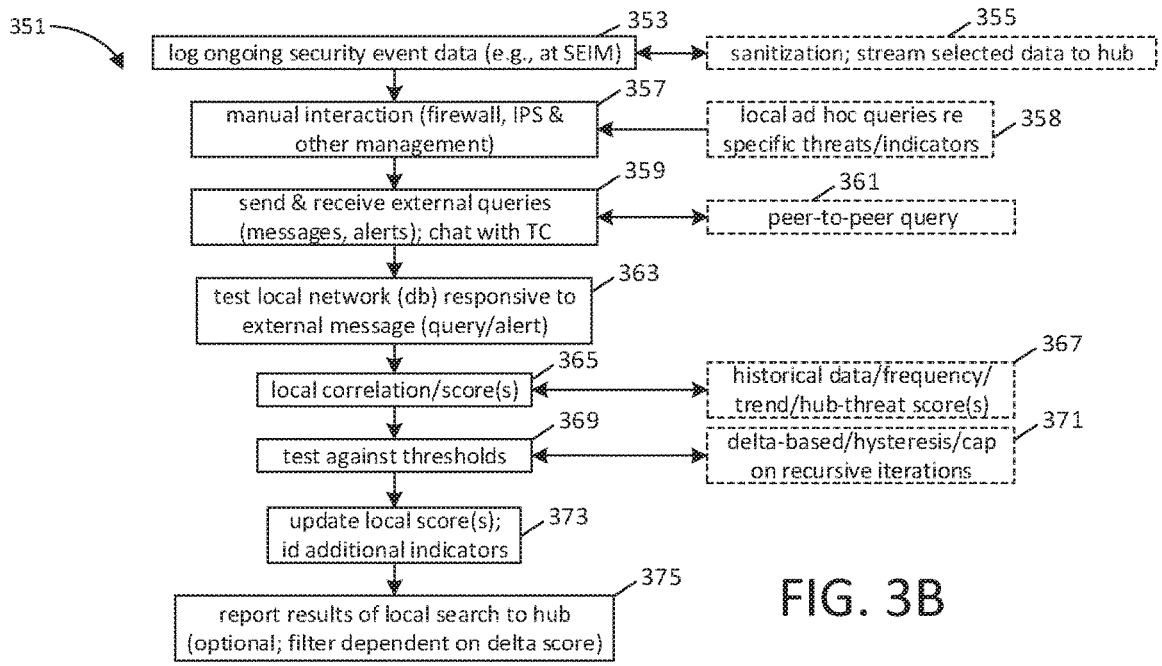
FIG. 3B is a block diagram that shows example functions associated with scoring of threats in one embodiment of an ACP.

FIGS. 3A and 3B are used to explain principles associated with threat scoring in one embodiment. As noted earlier, many types of scoring or threat ranking methodologies can be used, including a numeric methodology (e.g. threat level=4.0 on a scale of 0.1-10.0), or categorized scoring (e.g., threat level={low, medium, high, very high}) or some other methodology. For the example of FIGS. 3A and 3B, it will be assumed that a numerical scoring system is used, with one end of a numeric range (e.g., 0.1) representing a very low risk threat, and conversely, the other end of the numeric range (e.g., 10.0 representing a very high risk threat). Clearly, many methodologies are possible besides those presented by this simple illustration.

FIG. 3A illustrates exemplary functions 301 taken by a hub (e.g., that can be implemented by detailed implementations of the first instructions discussed above). A crawler (e.g. search engine or correlation engine) optionally adds a time stamp to newly received threat data and processes that threat data by comparing it with database content (303). As noted earlier, in one embodiment, the crawler compares the arriving threat data with a database of known threats (e.g., representing specific threats that are to be searched for against newly arriving data. In another embodiment, the crawler compares the arriving threat data with already logged security event data for the client base at-large or, alternatively, a subset thereof (e.g., events associated with a specific trusted circle, or group). In yet another embodiment, the scope of correlation searching can be specifically selected by each participating client by configuration (e.g., threat data for that client can be logged in the hub's security event database, and the client can instruct the hub to search for correlation only amongst members or trusted circles specified by the particular client network); again, many examples are possible. To this effect, for newly arriving threat data from different clients, even if reported in a sanitized manner, the hub uses measures to identify (or attempt to identify) the client (or a group associated with the client) reporting the specific threat data and it stores this information together with logged threat data (305); this then permits downstream (later) searching to be electively focused to data reported by similarly situated clients or groups. As an example, security event data for banks can be logged in individual records, each having a field that associates the specific item of data with a bank (or a specific client network); in one embodiment, multiple indicators can be stored, for example, indicating multiple groups (e.g., financial services, bank, credit card provider, on-line banking entity, or other designations of circle, industry, geography, operating system platform, and so forth). Per numeral 307, in addition to being logged (e.g., with time stamp and group or client indicators), this received threat data can be used to perform or trigger correlations of specific fields of the reported threat data or other data either across the database as a whole, or focused upon events experienced or reported by a specific segment or group. Responsive to this correlation, the hub updates (309) one or more threat scores for the specific threat data (or to generate a score if no correlation exists with the database). As specifically indicated by FIG. 3A, in this embodiment, every threat has a threat score which itself is dependent on, or is a product of, two or more separately tracked scores. For example, as noted previously, these scores can include an enrichment score (representing raw degree of correlation with database contents) a velocity score (i.e., a time based score indicating whether the threat is deemed to be increasing or decreasing), and these scores can be combined in a manner that is weighted; note that as indicated by block 311, threat scores can also be weighted according to indicator if desired. For example, a series of threat data representing a common file attachment (e.g., malware) can be weighted more heavily than threat data arising from a common IP address or can be weighted variably depending on specific IP address (e.g., certain IP addresses identified as a source of particularly damaging attacks could be weighted more heavily than other IP addresses). The threat scores can thus electively be made a function of the degree to which correlation is established, degree to which correlation is focused on specific groups, number of fields matched, type of fields matched, and many other factors, and if desired, these weightings can be made to vary dynamically. Whichever methodology is used, once the correlated threat data has been scored (and any associated score for previous incidence of the threat updated, as appropriate), the new (and potentially the old) scores can then be tested against one or more thresholds (313) to determine whether action should be taken. For example, if desired by an administrator of the hub, action can be taken any time a threat score is changed (e.g., pertinent client networks can be notified even if a particular threat score is downgraded). Alternatively, the administrator may elect to define threshold comparison rules in the hub which require that scores change by a certain delta amount as the result of upgrade as a condition of taking action.

Note that, if desired, the threshold tests do not have to be made with respect to the same threat data that just arrived. For example, if newly arriving threat data is associated with threat C, and a search of the security event data reveals that the reporting entity has also experienced threat A (arising from a common source as threat C), the correlation engine can be configured to search for correlation of threat A with other entities (e.g., members of the reporting entity's trusted circle) and used to update the threat score for either or both of threat A and threat C and compare either or both of these scores against threshold(s). As this narrative demonstrates, correlation and/or scoring can be performed on any desired basis, e.g., per circle, industry, platform geography or other basis, as indicated by numeral 315, and can broadly be used to identify attack patterns.

Dependent on the degree of correlation of a threat with any particular group, rules are then used to prompt communication by the hub with a particular group, or a client network that belongs to such a group (317). The hub formulates one or more messages responsive to the comparison by identifying the group in question, retrieving stored affiliation information linking the group to a particular set of client entities, and formulating messages for transmission to each identified target entity. In one implementation, each client network belong to the identified group is sent a copy of these messages. Per numeral 319, members of a group or circle can optionally also (anonymously) send queries to other members of the group or circle which seek correlation of a specific threat (i.e., specific event data) queried by those members. The hub-generated messages (and/or member-requested queries) are transmitted to each target entity, as appropriate, and are used to automatically trigger a search by the sentinel (or ACP) associated by the recipient network and/or to cause that sentinel or ACP to locally-compute or evaluate a particular threat score (321). The hub receives messages back from each recipient entity conveying the results of the local search and the locally-computed score, and the hub then re-computes its own score(s) as a function of the results returned for a particular group (323). Note that these results and local scores can be applied to update a number of different scores, e.g., if a recipient entity furnishing a local score is a member of multiple trusted circles or other form of group, then the reported score can be used to update threat scores for each group the recipient entity belongs to and, indeed, for the client base at-large. In order to minimize update processing, updates can electively be performed on a batch basis, or only when the difference between the local score and the hub score surpasses a threshold, or otherwise using a hysteresis or other convergence function, per numeral 325. As the hub updates scores and identifies additional threat indicators, this can initiate further messages or alerts to the same group or different groups, as represented by function box 327 and a flow arrow that connects box 327 and function 317.

FIG. 3B illustrates exemplary functions 351 taken by an ACP or sentinel (e.g., that can be implemented by detailed implementations of the second instructions discussed above). Each client network typically has a SEIM, intrusion detection system (IDS) or other system that logs all ingoing and outgoing Internet traffic. Other data can be logged by the SEIM and treated as events, for example, malware detection, firewall rules that are electively invoked by information security personnel, and other types of data. It will be assumed for purposes of this discussion that the system used by the client network for generating a database of logged data (353) is a SEIM and that the ACP software (second instructions) are adapted to interface with, or use a custom API to interact with, the particular client network's SEIM. This traffic can be used as the basis for data to be streamed to the central hub; such streaming can be optional in this embodiment, as denoted by dashed line box 355. It was earlier noted in connection with the hub that the hub can apply a timestamp to received data; such a time stamp in some embodiments can instead be applied by the logging mechanism (e.g., the SEIM) and adopted by the hub instead of using its own time stamps. Also as indicated by numeral 355, for any data streamed to the hub, a client network administrator would have electively configured filtering parameters to dictate sanitization to be applied to streamed data (i.e., to apply a selected degree of masking to reported data, to conceal client network identity and/or mask other sensitive data, e.g., personal email addresses, data operands, internal addresses and so forth) and also to otherwise dictate the type or volume of data to be streamed to the hub. Per numeral 357, the ACP also permits the administrator (or other information security personnel working for the particular client network) to manually interact with intrusion detection systems (IDS), intrusion prevention systems (IPS), antivirus (AV) and other network management systems used at the client network. For example, per numeral 358, the ACP provides an interface for information security personnel to search the client network's own databases for specific security event information, configure firewall rules and take other elective actions to protect the particular client network; while this functionality is also conventionally provided by a SEIM, in one embodiment, it is also integrated with the ACP and permits the client's information security personnel to interact with the information security personnel for other companies (i.e., entities), managing other client networks. For example, per numerals 359 and 361, the information security personnel can not only search a local client network database, but can send and receive external queries to other client networks which mirror queries used to internally search the client networks SEIM systems (or which virtualize or seamlessly integrate internal and external querying), exchange messages and alerts, implement security templates (e.g., firewall rules), chat with other information security personnel who manage other client networks within the same trusted circle and initiate selective peer-to-peer queries to ask about specific matters.

In addition to fielding peer-to-peer queries aimed at a specific member, the described structure also exchanges messages (alerts) with the hub as described previously. Thus, the ACP as denoted by numeral 363 also receives, on occasion, messages from the hub which request that the specific client network perform local searches of logged data using indicators passed by the hub, or that the specific client network otherwise compute a score for a specific threat based on local searching, provide such a precomputed score to the hub, implement specific templates (e.g. remedial measures), or take similar actions. As indicated by numerals 363, 365, 367, 369 and 371, to compute or analyze local scores, the ACP takes actions which generally mirror those described earlier for the hub. For example, the particular client network can first search a database of known (i.e., previously scored) threats to identify a match; in one embodiment, the hub simply requests and is provided this information responsive to request without additional correlation activities. As discussed previously, in other embodiments, the client network also then searches its local databases for updates, and can premise a score on historical data, for example, frequency or trend data, to develop its own enrichment and velocity scores (367), as mentioned earlier. Threshold comparisons can also be used, with the result of comparison gating (depending on embodiment) whether the local scores are updated 373, or whether the local scores are reported back to the hub (e.g., the ACP in some embodiment can, to minimize traffic, be configured to respond only when local scores exhibit a specific delta, satisfy a specific hysteresis formula, or fall within a cap on updates per time interval, 371). Other methodologies are also possible. Finally, assuming that any conditions for response have been satisfied, the ACP reports results of search (375) back to the hub (or specific other client network in the event of a peer-to-peer initiated search); as indicated by the FIG. 3B, the response in this embodiment includes any locally computed score, which enables the hub to (dynamically) reconcile its threat score with locally computed scores and the evaluation provided by the particular client network.

Reflecting on the principles just discussed, the ACP (e.g., instructions used at the client network to interact with the hub and/or local security event database) can perform local searching and scoring, just as can be similarly performed at the hub. This structure establishes a system for searching and associated threat scoring based on collaborative techniques, permitting relevance of specific threats and threat patterns with respect to specific groups of client networks to be reliably established. For example, as discussed, a hub can request that each client network in a selected group (e.g., a specific trusted circle) perform local threat correlation functions and report results back, permitting the hub to test relevance of specific threats or patterns of threats to the group. Relevance of a particular threat or pattern can dynamically change over time, and this capability provides the hub with an ability to test threats in progress or velocity predictions for the specific threats or threat patterns. In addition, providing the hub with an ability to centrally score threats, take actions based on that scoring, and occasionally attempt to correlate the central scoring by interaction with the various client networks or a subset thereof permits the hub to adjust information to current conditions, essentially using client feedback. It should be apparent that these techniques provide for development of accurate, actionable threat data, and the ability to spot emerging trends in network attacks, in a manner particularized for different industries, geographies or other groups.

Figure 4:
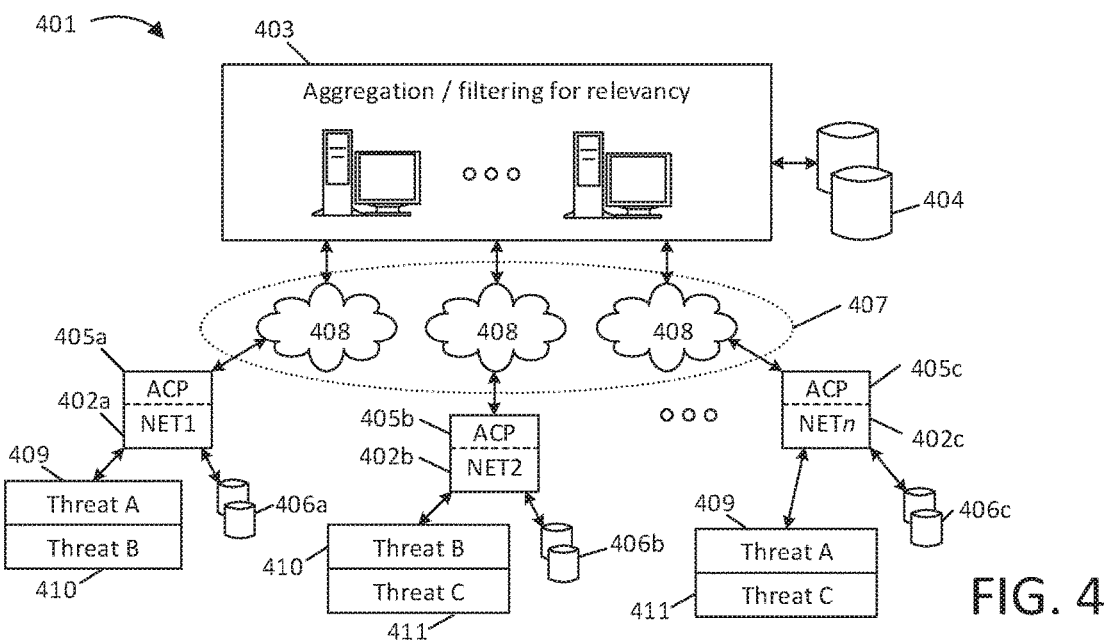
FIG. 4 is an illustrative diagram relating to providing services based on aggregated security events for diverse entities, e.g., for multiple clients.

FIG. 4 shows an illustrative diagram 401 that features an example configuration for central hub/aggregating service 403. More specifically, this service is seen to be connected to a wide area network (WAN) 408, in this case the Internet, and in turn to have a number of clients (client networks) represented as NET1 402a, NET2 402b, . . . NETn 402c. For example, each of these networks can be a public or private enterprise which pays a subscription fee to the central service 403 in order to receive access to pooled resources, receive immediate feedback to queries, and receive threat forecasting services for threats affecting the specific network, industry sector, affiliated group, and so forth. It is not necessary that each client network be connected to the same network 407, and to this effect each client network can be connected to the hub through one of networks 408, each of which can optionally be a WAN, a local area network (LAN), VPN or another separated network connection. Each client network in this example is seen to have local software, represented by an automated client portal (ACP) 405a-405c to facilitate interaction with the central service 403. For example, instead of filtering and interpreting security event data, the particular client network optionally has its ACP configured to automatically forward all logged event data directly to the central service 403, which operates as a cloud service. Alternatively, each ACP 405a-405c can be configured to instead or in addition locally log event data and to search its own database(s). In one embodiment, an ACP 405a, 405b or 405c can query its own databases (406a, 406b or 406c, respectively) and query the central service 403 only if correlation is locally first detected in databases maintained by that ACP, with a query to the central service 403 being a triggered result of such correlation. Again, many variations are possible. Each ACP 405a-405c can be further automated (e.g., controlled by software) to send queries to, service queries from, and send or receive security event data and/or query response data from the central service according to a normalized, common communications framework (CCF). Such a scheme can also involve using predetermined message types that optionally provide messages, queries, templates (automated configurations), alerts or other types of information, according to a defined framework (for example, as disclosed by the aforementioned patent applications which have been incorporated herein by reference). Each ACP 405a-405c can be structured so as to include all necessarily application program interfaces (APIs) to provide translation as necessary for machines and/or administrators operating in the environment of the particular network (e.g., NET1 402a, NET2 402b, or NETn 402c) and any common security system communication format or data storage format (e.g., archived Splunk or Hive data, as discussed below). Such messaging format, query and related capabilities will be discussed further below.

It should be assumed that one or more of the depicted client networks (NET1 402a, NET2 402b, . . . NETn 402c) will at some point come under attacks from an unknown source, represented by numerals 409-411 in FIG. 4, and further, that information is available that would enable real-time identification of this attack, but is buried amidst a vast amount of information logged by the target network. For example, network NET1 402a might experience Threat A 409 and Threat B 410 but be unaware that this data represents a risk to its networks. As a separate matter, network NET2 402b might experience a second set of security events including Threat B 410 and Threat C 411, and network NETn 402c might experience yet another set of security events including Threat A 409 and Threat C 411; it is assumed that these events represent risks to these networks (e.g., malware, viruses, spam, directed attacks, and so forth, of varying severity) but that these events may be very small subsets of the total event base received and/or logged for each network. The central service 403 in one embodiment receives the entire event base for each network and records these in a database 404, together with information representing the originating network; as discussed previously, the central service 403 in one embodiment correlates these threats and develops its own threat scoring to rank the threats and predict, based on this ranking, future attacks based on correlation. As an example, depending on implementation, the hub in this example might determine that all depicted networks (NET1 402a, NET2 402b, . . . NETn 402c) are similarly situated, and that all networks can expect to see Threat A 409, Threat B 410 and Threat C 411, and responsively provide forecasting services to this effect. In another embodiment, event data can simply be locally logged by each network, but the central service 403 provides a distributed framework for effectively pooling the data received by all of the networks (NET1 402a, NET2 402b, . . . NETn 402c n), and permits both searching of, relevancy filtering, and threat scoring of the pooled data. Note again that for purposes of privacy and client security, in many implementations, the information as reported and/or as indicated by a query or query response can be sanitized so as to not identify the reporting network, or to identify the reporting network using an identity code or in some other manner. To provide one non-limiting example, in one embodiment, each client can be represented solely by a shared secret key unique to that client, with all security event data being uploaded to the cloud and stored in encrypted form; a group membership is represented simply by a list of shared keys for all members of the particular group. When a new event is reported by a group member, all of the keys available to the service are tried and used to identify one or more groups having a key used to encrypt the new event; other keys associated with the same group are accessed and used to identify matching items logged in the database, and/or compared to a hash or other identifier; in this manner, or using a similar procedure, a small subset of events in the database, filtered according to profile information (e.g., a group membership) can searched for correlation. As should be apparent, this process represents one possible, computationally-intensive procedure for pooling and filtering already-sanitized data, and it is provided simply to illustrate one of many examples as to how security and sanitization can be applied in concert with the techniques disclosed herein. In the illustrated manner, the information reported by each network remains secret, with even the aggregating and reporting service being unable to identify which client reported specific information. In another embodiment, as alluded to previously, reported data is accompanied by a generic client identifier (e.g., a number) and stored in association with reported data, or a key structure (as just described) is used to identify the client (or a group) with an associated identifier being deciphered by the hub and stored in association with centrally-logged data. Many other examples will occur to those skilled in the art for providing various levels of security/sanitization, versus benefits gained by limited or unlimited use of client identity.

Returning to FIG. 4, note that the central service 403 can store not only events in one or more databases, but further can optionally store profile information for each client and optionally, rules for each client, as has already been discussed. For example, there can be one or more sets of rules defining when that client wants to receive notifications, how event data should be reported, whether the client accepts automated threat response templates, how messages should be configured, whether third parties should be notified, group membership trust levels, whether outgoing or incoming information should be sanitized, any network configuration information for the particular client, and so forth. In one embodiment, the ACP 405a-405c for each of the depicted networks (NET1 402a, NET2 402b, . . . NETn 402c) provides a secure administrator interface to locally define these rules, change group memberships and/or trust levels, launch manual queries of the (local or centralized) logged event database 404 (or known threat database 404) and so forth. Note that, as depicted, the central service 403 can be formed to have one or more servers or other computers or network equipment, for example, including web servers, proxies, routers, machines dedicated to security functions, mass storage devices, data centers, and so forth, at a single facility or at remote physical locations, and further, that these machines can run instructions stored on non-transitory machine-readable media (i.e., software), to implement the various described functions.

To provide an operational example, it should be assumed for the moment (1) that networks NET1 402a and NETn 402c are in a common first industry, that network NET2 402b is in a different second industry (or trusted circle), and consequently may experience different forms of attack or network risk and (2) that commonly labeled security events (e.g., Threat A 409) represent a common attack or issue; further, it should be assumed for the moment that (3) the central service 403 compares a single characteristic of industry membership (or trusted circle membership) for these networks for purposes of sorting stored security events. Naturally, many different types of network-matching characteristics can be used, and more than one characteristic can be used for correlating threats (e.g., including complex Boolean logic) can be applied to these ends; if desired, the filtering applied for any one client can be made administrator-selective, for example, by appropriate configuration of optional rules (e.g., stored as part of database 404). In a cloud repository scenario, if networks NET1 402a and NET2 402b have already reported data including the depicted threats 409, 410, and 411 to the central service 403, and network NETn 402c subsequently experiences its depicted events 411, the central service 403 could be configure to receive a report of these events 409 and 411 and to automatically identify that network NET1 402a is part of the same industry as NETn 402c; the central service 403 could then search its database 404 or remotely interrogate or search NET1's local event database 406a and identify that NET1 402a had also experienced Threat A 409, and it could upgrade an associated ranking (i.e., threat level) for this threat. Again, depending on implementation, threat scores can be respective to many different groupings of client networks, and so be calculated in a manner specific to perceived threat to a specific group. Depending on any default notifications or rules established for each network, the central service 403 can notify network NET1 402a, network NETn 402c, or both, as to the severity of the threat. It is noted that network NET2 402b and network NETn 402c also experience a common threat—Threat C 411, but in this example, network NETn 402c is not notified of this as in this simple example networks NET2 402b and NETn 402c are in different industries and are presumed to be differently situated. Alternatively, if the hub 403 determines that based on other attack patterns, network NET2 402b is likely to experience this threat next, or will in sixth months, the correlation engine at the hub 403 determines this fact and uses this to generate messages to alert network NET2 402b of this predicted or forecasted threat. In a distributed event storage model, network NETn 402c might also decide launch a query to the central service 403 related to a new event (e.g., optionally after locally identifying that a new event is correlated with other activity and represents risk) and the central service 403 might query a central repository and/or query other client networks, with either the query or returned data filtered for relevance; the same type of rank update or other action can similarly be performed in this event. As should be apparent, the actions taken can be far more complex in practice than these simple examples indicate; for example, many different groups, characteristics, rules and procedures can be applied and these can be dynamically changed (either automatically or via administrator participation). To cite another example, network NETn 402c might want to be notified of the common threat (Threat C 411) to network NET2 402b, or alternatively, it might want to be notified if both networks NET1 402a and NET2 402b experience the same security event (e.g., Threat B 410). In terms of threat scoring or ranking, the hub 403 can formulate its own threat score (e.g., for Threat A 409) based on correlation of data reported by networks NET1 402a and NETn 402c and, if it determines that a threshold has been met for this score, it can query network NET2 402b and ask it to perform local searching for indicators associated with this threat, and responsively update its score based on the results. If the hub 403 correlates threats Threat A 409 and Threat B 410 as part of an attack pattern, it can request all pertinent client networks (NET1 402a, NET2 402b, . . . NETn 402c) to search for related indicators, using presence (or scores) for Threat A 409 to triggers searches for Threat B 410, or to update scores for each of these threats based presence of the other threat and correlation with the other threat (and correlation with each particular group at issue). As these examples relay, in the depicted embodiment, the hub 403 (a) receives threat data reported by one of the client networks (e.g., NET1 402a), (b) correlates this threat data with some threat known to the hub 403, or other data logged in the hub's database 404 (or found in client databases via distributed searching/querying), (c) determines if a threat score identified by the correlation meets one or more thresholds, (d) correlates the threat score with a particular group known to the hub 403 (i.e. as being pertinent to members of that group), and with specific client networks affiliated with the particular group, and (e) takes action by sending messages to at least one client network belonging to the particular group based on these various correlations. As noted previously, these messages can request local client database searching, scoring, or other actions related to the forecasted or perceived threat (i.e., represented by the comparison of the threat score with the threshold and its link to the particular group).

FIG. 5 provides another flowchart relating to a method 501 of pooling security event information from respective, diverse networks. There are one or more networks works (NET1 540a, NET2 540b, . . . NETn 540c) that report security related events. As indicated earlier, a logging or searching service can be optionally integrated with one or more of these networks, and/or implemented separately (at a hub), as indicated by a dashed-line network designation 502. Each network optionally has a respective automated client portal ACP (503a-503c) for interacting with an information aggregation service. The information aggregation service can also optionally receive any other type of information, for example, RSS feeds, email reports (e.g., from DHS or another entity) and other information, per numeral 505.

As with the embodiments described earlier, the aggregation function logs events reported from multiple, diverse sources, per numeral 507. These networks can include any one or more of the depicted information sources, for example, a single RSS feed from a public source, as long as information regarding diverse networks is conveyed to/known or otherwise used to filter in dependence on at least one common characteristic that represents known or network profile information. In one embodiment, the method is performed on a service bureau basis for many respective, diverse networks 503*a-c*, and potentially including other networks reporting indirectly through an RSS feed or other informational source 505. As data is gathered, it is logged, optionally in a manner centrally reported to and stored in the cloud. As a new event comes in to the hub, per numeral 508, it is checked against a centralized or distributed database 517 (e.g., databases of client networks NET1 540*a*, NET2 540*b*, . . . NETn 540*c*) and used, to detect correlation between security events reported by similarly-situated entities. That is, as indicated by functions 507 and 509, queries and/or any result matches are filtered for relevance in this manner and used to better filter any matching information to events most likely of interest to one or more subscribing client networks (NET1 540*a*, NET2 540*b*, . . . NETn 540*c*). If a correlation is detected (508), then in this embodiment, rank of the detected threat is updated (511); nearly any type of score or indicator can be used to express threat severity (e.g., H/M/L for high, medium low, a numerical score such as 0-99, or some other type of indicator). Also nearly any desired function can be used to appropriately weight and/or score threats, for example, based on the number of filtered hits, based on a number or type of characteristics a prior reporter of a hit has in common a group or an entity reporting a new threat, based on other threat indicators (e.g., other threats originating from the same domain), or based on some other type of function. This updated rank is stored for future use. In one embodiment, as noted, scoring can be made client-specific (e.g., produced for that client according to client-specified rules 521). If a message is to be targeted to any particular entity (e.g., per numeral 515), sanitization (513) can optionally be provided at this point in order to protect client anonymity. For example, information that a particular entity has been hacked, is under attack, is collaborating (via the pooling service) in a shared defense scheme, has lost data, has responded a certain way and so forth could (without some form of sanitization) provide information to third parties in a manner that is undesired. In one embodiment, therefore, any notification is filtered so as to redact client network attribution (e.g., by masking IP addresses and/or domains associated with any one or more client networks NET1 540*a*, NET2 540*b*, . . . NETn 540*c*). In other embodiments, the information can instead (or in addition) be sanitized (513) by each ACP (503*a-c*) prior to reporting events to the aggregating service. In another embodiment, responsibility for sanitization can be distributed (e.g., shared) or can be made dependent on client specific rules (for example, as specified by a network administrator, operating via a dedicated management portal, as alluded to earlier). Note that as has been described previously, the updating of threat scores (511) can be based on an interactive model, that is, where the hub correlates data (and, e.g., updates the threat score at issue a first time), initiates remote searches (or other actions) at one or more client networks (NET1 540*a*, NET2 540*b*, . . . NETn 540*c*), receives reports back from those client networks, and responsively updates the threat score a second time (i.e., responsive to what is effectively requested feedback) and, as a consequence of scoring updates, perhaps performs yet further iterations of this update process (with the same group or entity or different groups or entities) to provide for a recursive score update process. Again, the number of recursive updates can be capped, or subject to some type of convergence process.

FIG. 5 also shows some of the various options introduced earlier. For example, per numeral 520, administrators for each client network (NET1 540*a*, NET2 540*b*, . . . NETn 540*c*) are optionally each provided with respective credentials to log in and perform configurations specific to the particular network (e.g., either by direct interaction with the networks' local software, e.g., via an ACP, or by configuring client-specific parameters used by a central service). As indicated by numeral 519, these administrators can adjust network specific profiles or related preferences including any group memberships, including trusted circle memberships. For example, in one embodiment, each client's ACP provides a portal for each administrator to send messages and/or establish a social structure (e.g., a chat or messaging framework) with other network administrators in the same general industry (e.g., via either a set of direct contacts, or a communications network and/or contact/group formation capability provided by a central service). Such a structure, or a deliberately defined ad hoc group, can be used as the basis for filtering and relevance scrutiny, as described earlier. Alternatively, the administrator can be presented with a set of questions, the answers to which can be used to build profile information, for example, by specifying things like company type, company identity, network type, types of machines, types of traffic, past threats, types of websites offers, security configuration, industry segments, whether online payment or online commerce is supported, and many other types of information. Using such a control plane, each administrator can optionally also define rules (521) used to rank threats for the particular client, rules (523) for sanitization/information sharing, notification preferences or a set of remedial measures or scheme for applying remedial measures (variously numbered 525, 527, 529, 531, 533 in FIG. 5). These various options are collectively represented at the bottom of FIG. 5. For example, in one embodiment, a notification can be sent to the network that first reported the threat, per numeral 525; that is, as noted earlier, a particular security event may later become correlated with other events and have an increased threat score or ranking; depending on the type of threat and the upgraded ranking for that threat, a party may wish to be notified of the assessment of increased risk, e.g., so that it can take remedial measures, assess possible theft or damage, or run a vulnerability assessment. Conversely, it may also be desired to notify the last reporter of a threat (527), or any prior set of prior reporters (529); such a set can in one embodiment be selected based on respective profile information (i.e., where notification selection can be predicated on characteristics or modifiers different than those used to filter event search results). A group can also be notified and/or one or more group members that have not yet seen the particular security event can be notified of a forecasted threat or threat pattern, per numeral 531.

A notification can also include a priori transmission of a remedial measure to an entity receiving a notification message. For example, in one embodiment, a database 535 maintained by a central query routing and/or aggregating service (either the same as database 517 or a different database) can store one or more measures adapted for use in defeating a correlated threat. If desired, the stored measures can be measures that have been reported to be (or proven to be) successful against the particular threat, for example, measures tried by other clients with success. In one embodiment, the query functionality provided below permits each client network ACP to selectively or automatically specify a threat and initiate a query seeking template responses to the threat; such a query can be routed to a filtered or selected set of contacts using profiling (including group membership) as described earlier. If multiple measures are discovered to be useful in defeating a specific threat, the notification message can include a ranking of different remedial measures in terms of their efficacy (and the query functionality can be used to establish this relative efficacy as well). A notification message can also include consulting advice or a link to obtain consulting advice (537), for example, with a security services professional; as this option implies, if services are provided to clients without their own in-house network security personnel, such a link can be used to connect a consultant (e.g., employed by the central service) with the affected network, to provide for remote network security support. If desired, instead of a message that conveys a link, the notification can itself consist of a security consultant (e.g., one that works for or on behalf of the aggregating and filtering service) being prompted to contact the affected network, to thereby verbally (or in writing) inform the affected network of the threat in question. Finally, per numeral 539, in some embodiments, one or more templates can be stored, queried or dynamically compiled, and sent to a client to address the specific threat in question. For example, if a client uses a security system (e.g., an intrusion prevention system or IPS) that can act on a template provided as an operand, the notification can consist of automatic sending of the template to the affected network, i.e., for use as an executable/operand that causes the security system (e.g., IPS) to implement a new security configuration specified by the template; such a hypothetical template might include a request for the IPS to block messages from a particular IP address, or address range, or firewall, and so forth. Many other examples are possible. Notably, the patents and patent publications referenced earlier (which have been incorporated by reference) provide detailed discussion of use of templates and automated configuration of virtual machines to implement preconfigured or dynamically configured security processes.

It was earlier mentioned that filtering can be performed according to any desired characteristic associated with a network and that a client ACP can permit a client administrator to establish a client profile, used for configuring interaction between the hub and the client network. FIG. 6A gives some examples of some characteristics that can be used. The list 601 depicted in FIG. 6A is meant to be illustrative, not limiting in nature. First, each client has a name or unique identifier used to designate the client (603). This can be separate from a client identifier 605, for example, a number or arbitrary name optionally used in communication (or stored with logged data) that does not inherently identify the client; if desired, for example, logged data can be stored in encrypted form, such that data must be decrypted, and then compared to a client database at the hub in order to identify the particular client network. A client profile also advantageously has stored demographic information (607) identifying any useful particulars about the client, for example, describing industry sector, specific field, specific products, number of employees, geographic location and so forth, optionally expressed as a string of codes or fields; in one embodiment, these can be used to automatically or transparently infer group affiliations for that client network with any desired hierarchy and level within a hierarchy. For example, a hypothetical code might identify a particular network as belonging to a company type of bank, while a subcode might indicate that the bank in question is specifically a high-value investor private banking service. As implied, multiple such codes or fields can be associated with an entity, for example, a given enterprise might both be classified as a company that makes microprocessors and for a company that sells electronic equipment to the US government with associated membership in any given category being nonexclusive to other categories. In other embodiments, codes or identifiers can be mutually-exclusive or configured in some other manner. Per numeral 609, predefined group memberships (e.g. selected by a client administer, including trusted circle affiliations) can also be relied upon in order to filter searches; for example, in one embodiment, the central service uses this information in preparing and/or routing queries and as a trigger and/or filter for correlation efforts. In another embodiment, such a service can also provide bulletin boards, chat mechanisms, online forums, or other mechanisms restricted to group members or open to the client base at large or the public. When a threat is detected, any desired subset of group members can receive a notification, filtered if desired for the preferences of the specific network (e.g., some clients might not want to receive certain notifications and can configure their rules to this effect). As indicated by numeral 611, a company's network configuration (e.g., operating system platform(s), software suites used, etc.), can be specified and stored, and used as a characteristic by which to group clients; for example, the type of firewall, the type of proxy configuration, the available network security software and/or hardware and other types of network particulars can be used as a characteristic to help filter relevance. Related to this point, the profile can store (613) the names of any APIs used to interface to the company's systems for purposes of exchange of security event data, and related information such as version number. The profile also advantageously stored one or more contact email addresses (615), for example, for chat services, management functions and other purposes (email addresses can also have roles associated with them, for example, network administrator, billing contact and so forth). There can be one or more billing options and associated invoice payment instructions, and these can be stored as part of field 617.

The profile is also used, as noted earlier, by a security administrator to specify rules and preferences for alert messages, query processing, and so forth. Per numeral 619, the profile defines a specific address (and related particulars) to be used by the hub to address queries for automated processing by the client networks ACP. Numerals 621 and 623 specify security and encryption information, including any login, password or other security protocols used to address messages from the hub to the client network, and including any logic, password or other security protocols used by the client network to stream security event data to the hub; as alluded to earlier, in one embodiment, a client uses a secret (shared or asymmetric) key to anonymously communicate event data and, in such an embodiment, field 623 is used to store this information for one or more keys or for associated key exchange. The client profile can also be used to configure and store client specific rules, including as indicated sanitization rules (625), any client-specific correlation and/or scoring rules (627), notification rules (to filter alerts and other messages, 629), and/or other information (631) as suitable to the particular embodiment. In one embodiment, a central hub and/or query service uses these types of information (or any subset of them) in order to link reported events to any particular client or other source, to send notifications or take remedial measure, to perform billing, or to provide other functions or services.

Figure 6B:
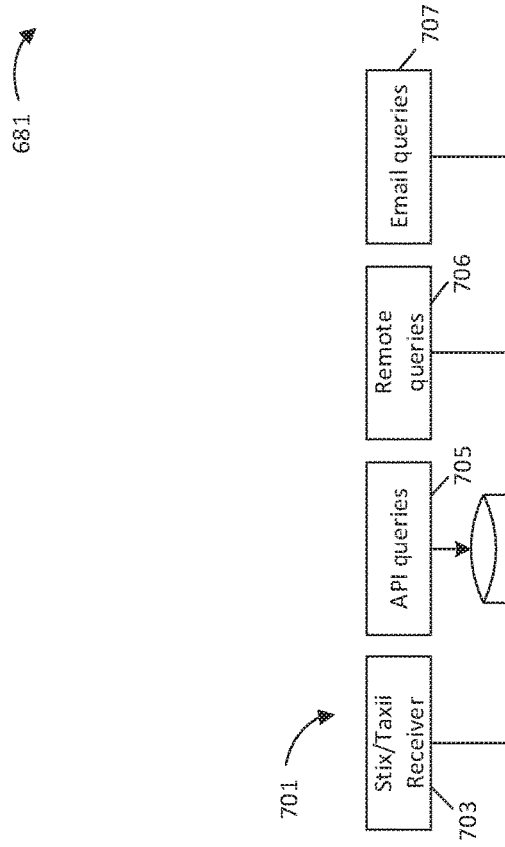
FIG. 6B shows one possible example of an affiliations database.

FIG. 6B provides an example of a record from an affiliations database, generally designated by numeral 681. This database can be stored by the aggregator/hub and used to associate specific client networks with specific groups, e.g., specific trusted circles. More specifically, it was earlier mentioned that many types of groups can be defined, e.g., trusted circles can be defined by client administrators as ad hoc social networks (e.g., a collection of administrators representing IT management for Wall Street banks), and that groups can also be built or inferred by the hub (dynamically or on a basis that is predefined), based on many different factors (e.g., market, company size, operating platform, products, geography, and nearly any other potential differentiator). In one embodiment, the hub creates a record for each group that lists affiliations (i.e., specific member companies) and it then stores this record in an affiliations database for use in query routing, targeting messages to clients or groups, logging data in a manner that can be tied to one or more groups, correlation services, predictive services, threat scoring, and other purposes. FIG. 6B shows an example of one such record that identifies group affiliation (with the affiliations database comprising many such records or tables, one for each group).

More specifically, as indicated by numeral 683, each record includes a group name 683 which can be subjectively selected for ad hoc groups by a party initiating the group, or a descriptive name (e.g., Wall Street banks) in the case of an inferred or automatically populated group. The record also identifies an owner of the group (685), e.g., with administrative privileges over group membership, group preferences (e.g., notifications, scoring, etc.) and group deletion, and a field (687) to identify market, product and similar industry characteristics of the group (e.g., preferably in the form of a numeric code). These values help characterize and identify the group. In addition, the record itself has a number of entries, one for each client network affiliated with the group. For example, each entry can have an affiliation number (689), a client name or other identifier 605, demographic information 607, platform identification 611, a contact email address (e.g., for chat and communication services, 615) and one or more keys 693 (e.g., used for anonymous reporting of data and/or authentication and/or encryption as described herein). In summary, each affiliation identifies a specific client network, optionally being populated with enough information to directly provide chat services, provide for verification that a member belongs to a particular group (e.g., by successively applying each key associated with the group for authentication purposes, and other desired functions) based on the record. If desired, other fields (e.g., address for queries and security protocols) can optionally be included in this database or can separately be looked up when it comes time to address messages to group members or to forward queries. The number of entries determines the number of members of a group, e.g., for a hypothetical group of Wall Street banks, if there were 11 members, there would be 11 entries in the record seen in FIG. 6B. Note that although the term record is used, affiliations information can be stored in any desired manner, for example, as part of a relational database (e.g., such that the structure depicted in FIG. 6B represents a linked database or a table).

Figure 7A:
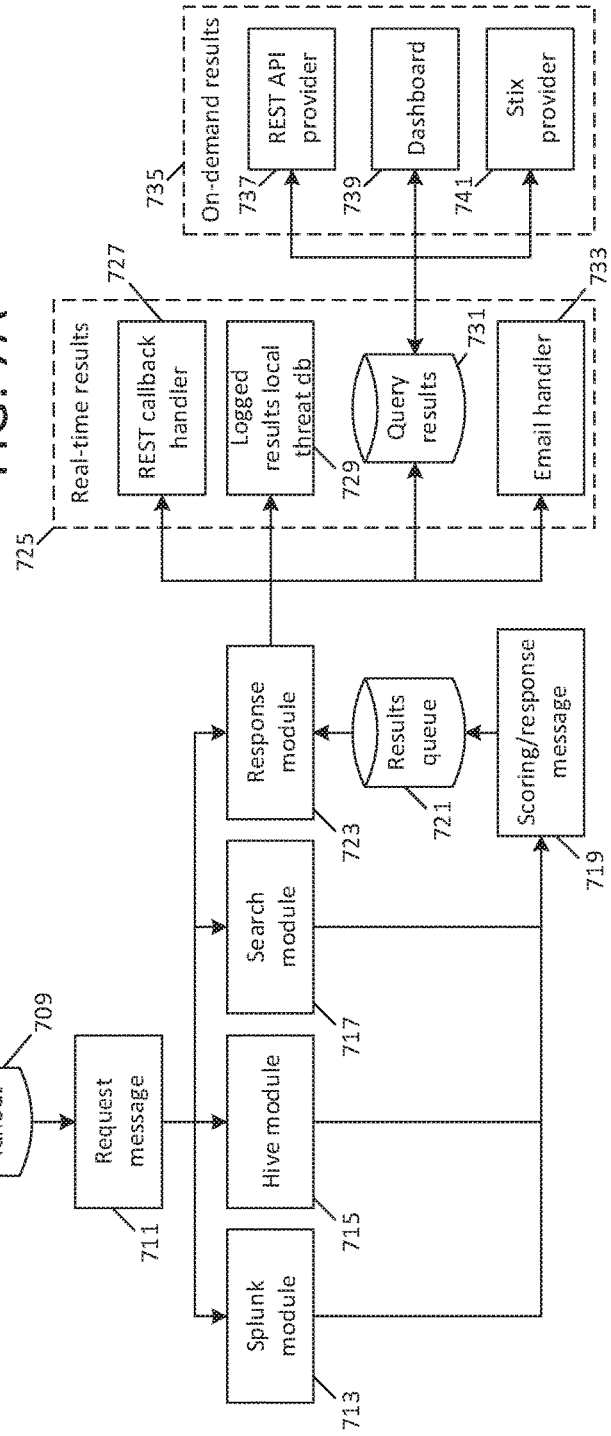
FIG. 7A shows layout of one example of a system used for provision of services based on aggregated security events; more specifically.

FIG. 7A shows a block diagram associated with one implementation 701 of an automated client portal (ACP); the same architecture can optionally be used for each client as well as the hub, or respective, different architectures can be used. As was introduced earlier, the system represented by FIG. 7A can be partially or entirely implemented as software, i.e., as instructions stored on non-transitory machine-readable media that, when executed, configure one or more machines (e.g. computers) to act as special purpose machines with circuitry that necessarily responds in a constrained manner (defined by the software and its associated functions). Note that both of these things represent logic, i.e., software is a form of instructional logic, which the machines and their circuits or circuitry represent a form of hardware logic (or a combination of hardware logic and instructional logic).

It should be assumed that a typical ACP is configured to interact with a potentially unknown and potentially large set of diverse internal security systems resources. As such, security event data might be stored in many different manners within a client's network. Note that FIG. 7A represents a ACP that is optionally configured both to search locally for event matches, as well as to interact with a central query service as described earlier (and to respond to queries sent to the client from such a service). The ACP can interact with multiple networks (e.g., if implemented by a central service as described) and can forward queries and/or data using the communications scheme discussed further below. As seen in FIG. 7A, the depicted ACP includes software modules that implement four basic types of parsers or receivers including (a) a STIX/TAXII receiver 703, (b) API queries 705 from various other sources (e.g., non-STIX/TAXII compliant systems), (c) a remote query receiver 706, and (d) email queries 707, for example, initiated by a system or from a human administrator for the client. The function of each receiver is to extract/translate information representing a new event (e.g., and associated local query, or a query from a remote source such as the hub) into an accepted communication type, for example, using a normalized query structure (and/or a normalized data exchange scheme pursuant to the common or standardized communication format, or CCF). As a new security event is detected, or in response to an external query, the ACP then searches local client security system databases and generates a result. In the case of the central service, the system can be further designed to have instructional and/or hardware logic that forwards queries to other networks, for example, in association with group data or other network profile information stored local to the central service. A query fanout function 709 converts a received query to a format usable and understood by any local, diverse data management systems and then farms this query 711 out to different (parallel) modules 713, 715 and 717 that provide APIs to these systems. That is, a typical large enterprise might have diverse databases that store event data as Hadoop data or in another format, structured or unstructured. Modules 713, 715 and 717 represent the various APIs necessary to interface with client security systems and associated databases. For example, as indicated by numeral 713, one of these modules can utilize software available from Splunk for searching associated database data. As indicated by numeral 715, Apache Hive software can also be used (e.g., to search Hadoop data). Per numeral 717, any other type of module can also be used in parallel, running on the same machine as the other search modules (e.g., as a virtual machine) or a different machine; for example, depending on environment, APIs may be implemented to interact with IBM's Secure Radar, HP's ArcSite format, RSA's Security Analytics, and so forth. Such API's can be custom to the specific client, according to the specific security systems it implements, or can be provided as part of a set of stock modules that provide ready APIs adaptable to any number of different, known systems or formats. As indicated by numeral 719, as each query is completed, it results in updated scoring and a response message 719 transmitted between software modules. Each response message 719 is stored in a queue (721) for processing by the response module 723; the function of the response module is to respond as appropriate when queries are deemed complete (i.e., when they resolve or when a predetermined time has elapsed). Note that in the case of a central service, the response module 723 and the results queue 721 can be used to monitor outstanding queries to other client networks (including the hub), and to provide a unitary response to a requesting client. Note that a structured query format with enforced response times, as discussed further in the patents and patent publications which have been incorporated by reference; if a first type of query is received (calling for a real-time response), the response module responds within a specified deadline (e.g., 1 minute); if a second type of query is received (e.g., calling for lower priority asynchronous response, e.g., whenever searching is complete), the response module responds only once all parallel queries are resolved. Alternatively, the system can be configured to provide both real-time response as well as asynchronous response (e.g., once an outstanding query has returned with some type of result). A function of the response module 723 is to collate the various responses, such that (as appropriate) a single response message or expected response format is provided irrespective of the number of modules employed.

Box 725 represents a set of real-time results (e.g., results obtained responsive to a local search within a period of time, e.g., 1 minute, or per other time period). First, per numeral 727, a REST callback handler can be employed to provide automated query response. Alternatively or in addition, an email handler 733 can be employed to respond to queries (optionally if an incoming remote query was received by email), or to direct further, external queries or notifications. Again, the format of response can be configured by pertinent client rules. Pertinent query results can then be logged 729 and made available responsive to the initiated query, per numeral 731. These results can then be displayed and/or sent out automatically or on-demand, per dashed-line box 735. For example, a REST API provider 737 or STIX provider 741 can be used to transmit outbound query results (e.g., to a central aggregator or query function). Results can also be locally displayed on a client dashboard, per numeral 739.

Figure 7B:
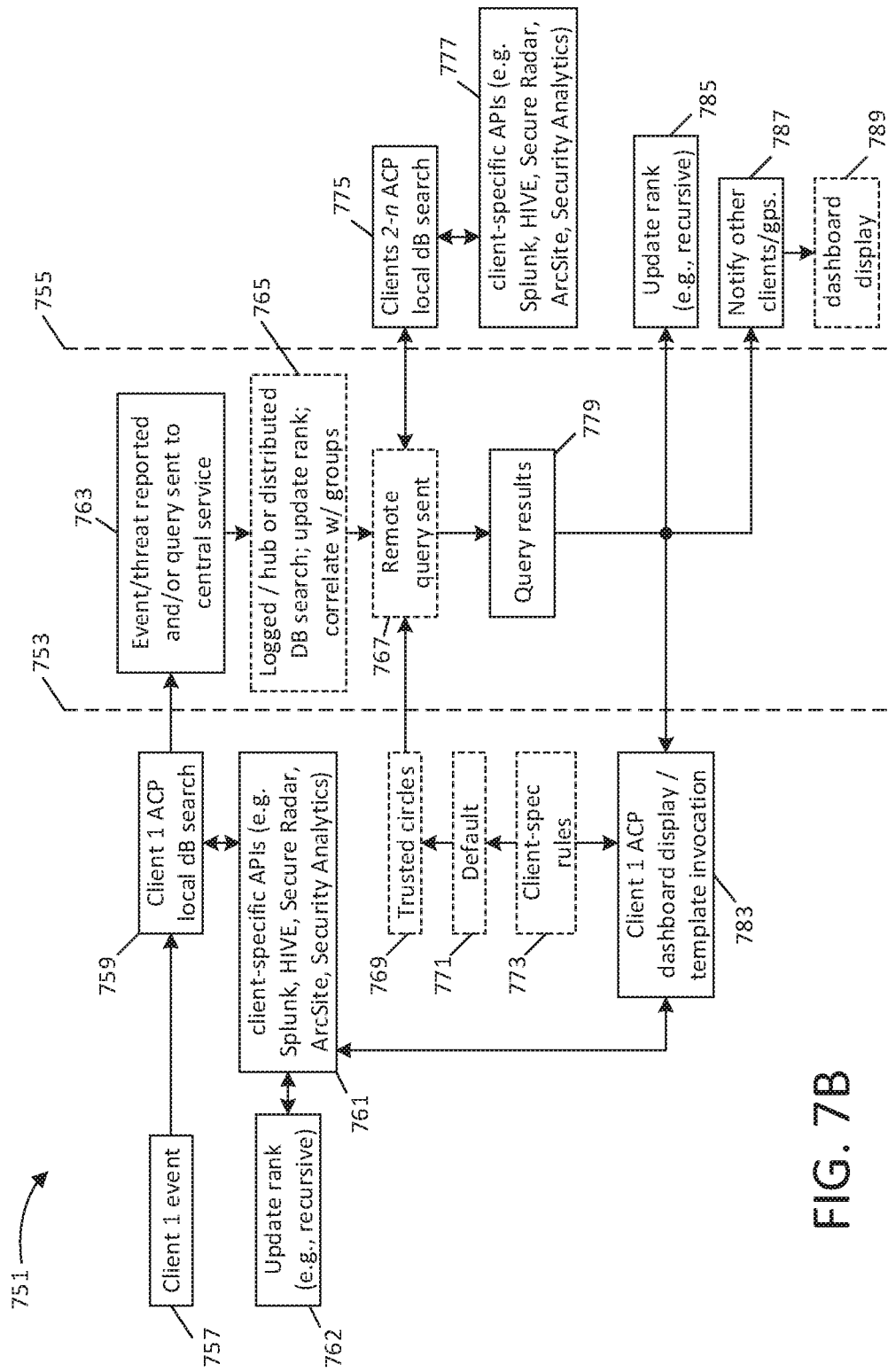
FIG. 7B is a flow diagram showing how the ACP from FIG. 7A might interact with a centralized service (i.e., a hub or aggregator) and/or other client ACPs.

FIG. 7B provides another flow diagram 751 that depicts an example interaction with a central service using the ACP structure just described. Note again that one embodiment of the techniques provided by this disclosure provides an ACP run on a single client (e.g., software on machine-readable media or a machine, collection of machines or system configured for specific operation). Another embodiment provides for a central service run with or without such client software, e.g., this central service can also be represented by software on machine-readable media, as a machine or collection of machines or system. In FIG. 7B, two vertical, dashed lines 753 and 755 denote network boundaries between (a) a first client network, represented by functions seen to the left of vertical dashed-line 753, (b) a central service, represented by functions seen in between vertical, dashed lines 753 and 755, and (c) third party networks, represented by functions seen to the right of vertical, dashed line 755.

Specifically, it is assumed that the first network detects a security event, per box 757. Client software on this first network (e.g., a client ACP) is optionally configured to search a local database, as indicated by block 759. Such a search can use the various parsers or APIs described above in connection with FIG. 7A to perform any desired interface or translation with existing client network equipment or data formats. As indicated by box 761, these APIs can include handlers for Splunk, HIVE, Secure Radar, ArcSite and Security Analytics systems available from respective systems providers, and can be used to generate a local score of each given threat. Rankings of threats may be updated 763 (e.g., recursively) based on the new scores. Note that as indicated earlier, this is not required for all embodiments, e.g., the first network can be configured to report all events to the cloud (e.g., to the central service). The first network can also be configured to send a query related to the received security event, either immediately, or upon a desired condition (e.g., correlation with data in one of the systems represented by box 761).

The query from the first network and/or events reported to the cloud are sent to the central service, per numeral 763. This service optionally logs this event (e.g., as part of a cloud storage service) and performs correlation and score update services, per numeral 765. If desired, the central service also optionally routes the query (767) to one or more third party networks (e.g., networks optionally selected based on one or more characteristics (or profile information) in common with similar characteristics (or profile information) of the first network). In the case where the first network simply reports an event to the central service, the central service can perform correlation and score update. Note that group membership can be used to route and or direct any query or filter data, i.e., responsive to profile parameters for client and group, as described earlier.

FIG. 7B indicates that processing of data streams (or received queries) can be configured to automatically respond to specific threat levels, or according to client-provided rules (e.g., stored as part of each client's profile with the central service). For example, as indicated by dashed line-box 769, a set of trusted circles can in one embodiment be established by each client for use with different groups or threat levels; as an example, for any group selected by a client (i.e., formed or joined by a client), the client can identify a threat level and default notification policy, e.g., such that it is alerted according to specified rules if a threat matches a given level. In one embodiment, each group (or other profile characteristic) can have red, green, yellow or white levels, or another rating system (such as a numeric system, as described earlier). As an example, a red level can imply, specified automated action including provisional and instantiation of remedial measures. The other color levels in this example have different associated characteristics, for example, requiring human intervention (e.g., a click) before a remedial measure is implemented. Actions can also be varied depending on trusted circle level, for example, responding to just a single query requester, or to all group members. These various principles indicate that in one embodiment, each client (including the first network) can set default actions per numeral 771, or can specify client-specific rules, per numeral 773. Thus, in response to a data stream or query, the hub locally searches and/or performs correlation (alone or on a distributed basis) as indicated by numerals 765 and 767. Other client networks, as appropriate, receive a query or event which has been sent out and search their own local databases for indicators specified by the hub, per numerals 775 and 777. The hub receives results per numeral 779 and responds as appropriate (e.g., takes action, if desired, dependent on client-specified policies or rules). For example, the first network can specify minimum threat levels for notification, or can control the format or channel used to notify it of a threat or how remedial measures should be implemented. Results can be displayed to an administrator per a dashboard function for the first network (e.g., via an ACP) or a template or other remedial measure can automatically be applied, per numeral 783. Other actions that can be taken, per numerals 785 and 787 include updating a stored threat score (or multiple scores). Similarly, the hub as noted previously can (following scored update) notify other clients of any updated threat level (785) or notify other groups of threat forecasts (787). For other clients that utilize an ACP as has been described above, results can optionally be displayed via their respective ACPs' dashboards (789).

Figure 8A:
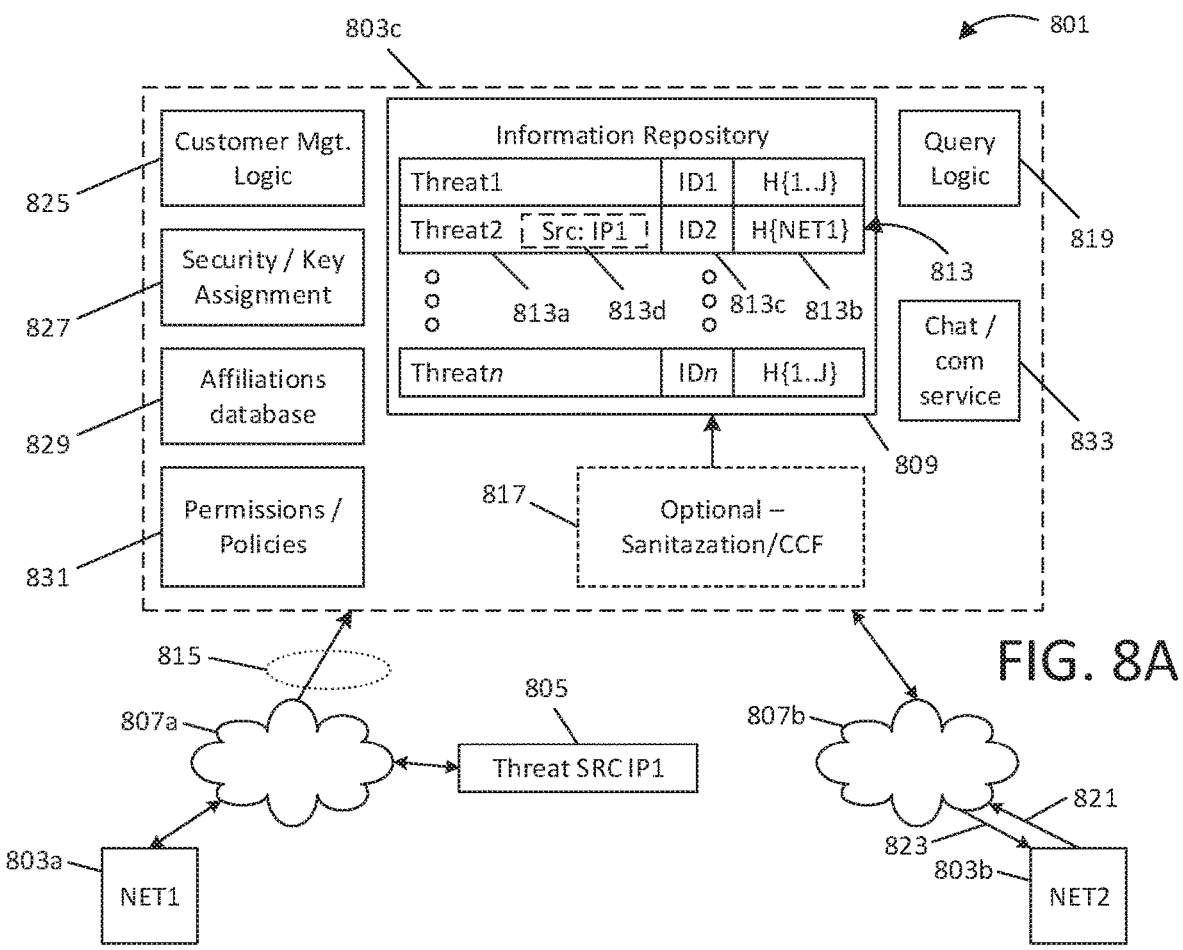
FIG. 8A provides an illustrative view relating to example functions of an aggregator in logging threat data from various clients.

FIG. 8A shows an exemplary scheme 801 that uses an information repository to store events relating to network security. Generally speaking, four entities are illustrated in FIG. 8A for purposes of illustration, including a first client network 803a (i.e., NET1), a second client network 803b (i.e., NET2), a source of a threat 805, and the hub 803c that hosts an information repository 809 (e.g., a database) of logged threat data from respective client networks. Note again that while the scheme of FIG. 8A involves a centralized database, it is also possible to have distributed mechanisms (e.g., using information stored directly within networks NET1 803a and NET2 803b for example), with a crawler or other mechanism used to acquire information and cache information at a query origin point or midstream network node as appropriate. In one embodiment, each of the depicted networks (e.g., NET1 803a, NET2 803b and the organization acting as a central service each has their own event database or information repository 809, as discussed earlier.

In the context of FIG. 8A, an event or an item of threat data can be any type of information or data record that one network (or network administrator) might wish to log or to share with another network (or network administrator). Note again that although the term threat data is used, it should be understood that what means is that there are diverse data types that represent potential threats, some legitimate and/or harmless and some representing true sources of potential damage or compromise. For any threat data, its particulars might be such that a network administrator will wish to monitor, restrict or block that threat item (or corresponding network activity such as, for example, traffic exchange with an IP address associated with the threat item); for example, a site, file, individual having inappropriate content (e.g., infringing or offensive content), or serving as a source of spam, viruses, or directed attacks would typically represent a true threat. Again, any source or destination of traffic can represent a potential threat, e.g., as used herein, threat data can encompass a circumstance where a relatively benign site is evaluated to determine threat level (e.g., and is assigned a threat level of none or low, for example).

In FIG. 8A, it should be assumed that the threat data being evaluated has a particular internet protocol address (IP1) and that this particular address IP1 has been evaluated by network NET1 803a as potentially being a source of improper access attempts, SPAM, viruses, inappropriate content, or other activity that should be monitored and/or blocked. For example, security systems within NET1 803a can evaluate address IP1 as part of routine monitoring of a source or destination of traffic across a network 807a (e.g., a wide area network or WAN such as the Internet). It should be assumed that network NET1 803a wishes to share its evaluation with other networks or parties such that such other networks or parties can evaluate and potentially block access to or from site IP1 even though access to or communication with such other networks or parties may not yet exist. Accordingly, network NET1 803a transmits a stream of traffic 815 to the hub 803c, for purposes of logging one or more events, performing correlation services, and initiating related messages, actions or queries. Note that there can be many event records generated that pertain to site IP1 and that reported threat data can optionally be generated in response to a security alert (e.g., detection of an inbound attack), or in response to any other desired evaluation. Note that the event logging function may be transmitted in part over a public network and that the event logging information may reveal sensitive information such as a vulnerability of network NET1 803a, a source of loss (e.g., representing potential loss of personally identifiable information), or the location of sensitive sites or systems; thus, in some implementations, client network 803a (NET1) sanitizes and encrypts such information before transmission of traffic 815 (e.g., for transmission over a public network). Sanitization is advantageous if logging of events is to be maintained by a third party (e.g., a third party security services provider) and/or if logged event information is to be shared with third parties (e.g., partners, specific third parties, members of a trusted circle, and so forth).

The information repository 809 logs reported events in a manner that is searchable. Logged fields for each event may include nearly any type of information, e.g., without limitation, any fields discussed below in connection with FIGS. 8A and 8B and, if desired, the information repository can be designed to store many different event types (e.g., mixed types having different fields or template information, optionally sorted by event type or class). Each event is stored as a discrete record in the information repository 809 (or potentially multiple repositories), and is seen in this embodiment to include a threat event type, an IP address and a hash or digital signature associated with the corresponding event based on one or more keys unique to each different source of event reporting. In particular, it was earlier mentioned that an event can be generated by client network 803a (NET1) that evaluates the source of the threat 805 as a threat and that a particular event record 813 is generated and submitted to the information repository 809 to represent this evaluation as a specific event. Numeral 813a refers to the information logged for this specific event record, numeral 813b represents the digital signature applied to (or the hash generated from) this event record using a unique symmetric key assigned to client network 803a (i.e., and associated with network NET1 803a), and numeral 813c represents an optional client identifier (or group identifier) stored as part of the respective, logged data item. Note that the digital signature for each logged event will be dependent on the information in that threat record, as well as the key or keys used by the party that signed/provided that threat record; the information event record 813 in this case is also seen to contain information (813d) regarding the perceived source of the threat, i.e., source address (Src:=IP1). In the depicted embodiment, one or more shared keys can be provided to each client or network (e.g., client networks 803a and 803b) by the party or organization managing the information repository, known only to these two parties; this symmetric key architecture can optionally be used to provide anonymity and capabilities for source-specified data filtering. As mentioned above, encryption and signing are optional, representing a design choice for the specific embodiment, and alternate embodiments can use other forms of security (e.g., PKI, two-factor authentication) or no encryption or authentication capability at all.

It should be assumed that a second network provider (e.g., operator of NET2 803*b*) now encounters the network address IP1 either as part of incoming or outgoing traffic via WAN 807*b* and wishes to perform a reputation check. In some implementations, this second WAN 807*b* also represents the Internet and can therefore form a part of WAN 807*a*. Accordingly, the second network NET2 803*b* sends an event report or a query to the hub 803*c*, which then determines whether there is any available reputation information associated with network address IP1. Note that as mentioned above, in other embodiments, this query can be run in a distributed manner, e.g., forwarded to multiple nodes (e.g., as an asynchronous query request). This information is received and processed by query logic 819, and is run against the (central or distributed) information repository 809. In this case, the query logic 819 will detect a hit because the argument IP1 will match specific event record 813 of the information repository (i.e., that record containing IP address field 813*d* matching IP1). Note that it was previously mentioned that event record 813 can be stored in a manner that is sanitized. In such a situation, there may be no information directly identifying the target of the particular threat event record 813 as client network 803*a*. However, the digital signature or hash stored for this record [H{NET1}] in this embodiment will correspond to only one shared key assigned by the hub 803*c*. The hub (optionally using the client ID or group identifier, e.g., transmitted along with newly reported threat data), therefore identifies the pertinent trusted circle or group and computes a hash using each known key until the hub finds a match between a stored hash and the newly-computed hash, which in turn identifies a particular key. In the context of filtered or restricted queries or data, the list of acceptable keys (as introduced earlier) can be restricted based on profile information, or another means of restricting the query and/or results can be used. In this embodiment, when a match is detected (e.g., representing correlation) the hub then optionally uses a group affiliations database (829) to access a set of permissions specified by network NET1 803*a*. For example, such policies can specify which fields may be shared, a permitted list of recipients, and so forth. Note that it is possible for NET1 803*a* to be assigned many such keys, each associated with different policies and/or groups and/or potentially used for different event types. These policies and related information can be stored in database 831 (e.g., as part of a relational database including the information repository, an affiliations contact database, client network preferences, and other database information as necessary or appropriate) and retrieved as necessary. The retrieved permissions, in turn, can be optionally used to specify whether and how information regarding specific event record 813 can be shared with third parties. Assuming that network NET1 803*a* allows its reported information to be shared with network NET2 803*b*, the hub can respond with a reply to the query 821 from network NET2 803*b* with information providing reputation information for IP address IP1, as represented by numeral 823.

While a symmetric key sharing scheme is referenced above for purposes of optional encryption in-transit and anonymous correlation of a reporting source with a set of permissions, some designers may instead choose to store information without anonymity or using other mechanisms for source identification and permission correlation (e.g., such as directly using client network names). Also, as noted earlier, events may include things other than threats and may refer to reputation of things other than IP addresses; for example, the same techniques can be employed for file name reputation (e.g., virus detection), evaluation of email sender domain names, identifying individual end users and many other types of arguments.

Note also that FIG. 8A shows that the hub 803*c* also employs optional sanitization 817, customer management logic 825, and a chat or communication service 833, as stated previously. In one embodiment, events can be reported using an automated web interface of the hub or an ACP (as described earlier); in such a case, especially if third party networks 803*a* and 803*b* lack sanitization protocols, the hub 803*c* can optionally sanitize reported events or convert reported data to a predetermined communication format (e.g., CCF) for storage in the logged event database information repository 809. Alternatively, unsanitized information can be stored and then optionally sanitized as a part of any query processing or reporting of query results. In an embodiment which supports a set of source-specified permissions (e.g., stored in database 831), optional chat, email, or other social networking services can also be employed to share information or queries or filter results between cooperating networks (e.g., NET1 803*a* and NET2 803*b*) or to otherwise provide for communication between these cooperating networks, e.g., based on at least one common profile characteristic. For example, if desired, an administrator of network NET1 803*a* can choose to provide contact, telephone and/or email information as part of a response to queries from other networks, with such information automatically forwarded to each querying network. Many other possibilities also exist, e.g., the administrator of NET1 803*a* can be notified that another network has reviewed event data from NET1 803*a* and can at that time elect to have such contact information offered to the administrator of NET2 803*b*. If the parties have a pre-established relationship (e.g., as friends), the event reporting source (NET1 803*a*) can choose as part of its permissions to provide chat-status (either in connection with a query or event, or on a general basis). Such a chat or messaging service can optionally be linked to events or to the information repository 809, to permit network administrators (e.g., of networks NET1 803*a* and NET2 803*b* to share and discuss information regarding threats in real time or on an asynchronous basis). If also desired, this service can also be used to generate alerts, for example, to notify the party reporting an event that another party has generated a related event (i.e., an event with a common field). Such alerts can then be sent to a client requesting this feature, such as an administrator for client network. Clearly, many such optional features and implementations exist.

FIG. 8A also provides detail regarding methods, services and operational models. For example, hub 803*c* can host the information repository 809 and related services on a subscription basis, providing keys and information-sharing services for fee. Information exchange with each client is managed using databases 825, 827, 829 and 831, with one or more keys assigned to each client in connection with a subscription. If desired, each key can be provided on a temporary or one-time use basis.

Also, depending on the level of correlation established in response to a query (or a response), further actions can be taken. For example, in one embodiment, an event is detected at a first network. Responsive to this event, a query or a correlation is performed against information possessed by a second network (e.g., the query can be performed by the hub 803*c* as a standalone function, or in a manner integrated with the second network 803*b*). Additional actions can then be taken depending on the result of this correlation, as described previously; for example, if the initial correlation yields a match, indicating a possible security risk, this correlation can be deemed to warrant further searching (for example, of a local database or one or more third party networks), conditioned on this match.

Figure 8B:
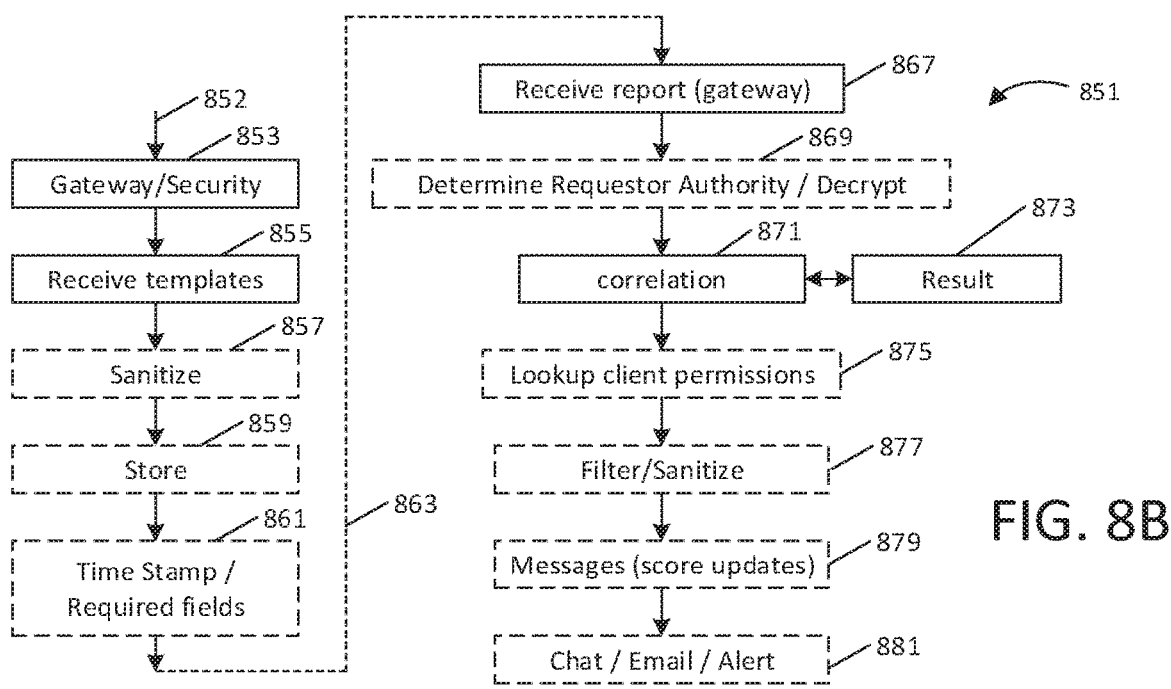
FIG. 8B is a block diagram relating to example functions of an aggregator in logging threat data from various clients.

FIG. 8B shows more detail associated with a possible method, service or operational model, generally designated using reference numeral 851. In particular, individual events are reported (automatically or selectively) as per numeral 852. These events can be transmitted over a private or public network for receipt by a gateway 853. The gateway confirms authenticity, i.e., that the event corresponds to a valid client network, and also handles receipt and transmission errors as appropriate. For embodiments where event reporting is encrypted, the gateway 853 also provides decryption services. In one embodiment, as referenced by numeral 855, the reported events are received in the form of predefined templates using specific fields, e.g., in a CCF, for example, as represented by the non-limiting examples discussed below in connection with FIGS. 8A and 8B, and/or otherwise using a STIX- and/or Taxii-compliant protocol. The event reporting can also be made interactive, e.g., using an event reporting interface of the hub 803c, with each template being created by the client network and/or the information repository, as desired. In one embodiment, as noted, each client has software (e.g., an ACP) that creates a template and uses a VPN or secure transmission scheme to transmit the event record to the information repository. As depicted by dashed-line blocks 857, 859 and 861, the information repository optionally sanitizes, stores and generates time stamp information for each record as appropriate, for example, in mass storage, server memory, on magnetic tape, or in another manner. These general functions complete an offline process via which each event is reported and logged. Note that in a dissociated model, these logging functions can each be provided by multiple parties, and that query functions can be provided by these same parties or a different party or service.

As referenced by dashed-line 863, correlation services are performed at a later point in time for newly-arriving queries (863). Each query can be received by a gateway 867 which, for example, services a number of sources of queries, such as third parties, different network providers or administrators, and so forth. As represented by dashed-line block 869, in one embodiment, authentication and/or encryption is performed so as to ensure reporting of events only from authenticated parties; accordingly, in this embodiment, inbound queries are screened to verify requestor authority and/or to perform decryption. If a data is authentic, as represented by numeral 871, correlation services are performed with the security event database, returning a result 873. This result can provide a null response if the query is unsuccessful and can also return multiple hits, dependent on design and, as mentioned previously, can also produce or be reconciled with a threat score. Correlation is also performed to identify a specific group or groups to which the newly arriving threat data is pertinent, with appropriate thresholding. Per numerals 875 and 877, as appropriate, a set of client permissions (and/or group selection for correlation and/or group preferences) can be looked-up (e.g., using the client key or client ID as an index, if desired). If a message is to be sent to a client or group of clients which provides data or threat-specific information, the information is optionally sanitized (if this has not been done already, per numeral 877). Messages 879 can then be generated and transmitted one or more clients as desired, for example, initiating further querying, to update threat scores, or for other purposes as indicated. Finally, a chat, email or alert service can also be established, optionally as part of the query process, per numeral 881.

Figure 9A:
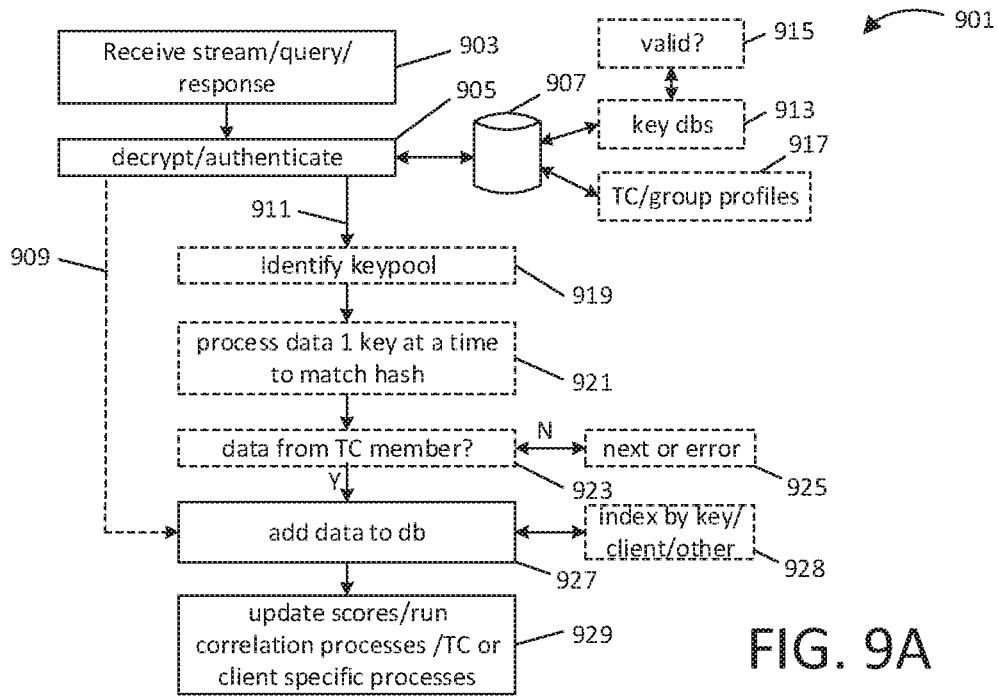
FIG. 9A is a block diagram that identifies an example mechanism for secure client authentication where information transmitted by the client does not directly identify client identity.

FIG. 9A illustrates one method of providing for anonymous reporting or streaming of data by a client network. The method is generally designated by numeral 901. More specifically, per numeral 903, the hub receives the stream of data or query/correlation response from a particular client in a manner that has been sanitized by the client, as discussed earlier. It then attempts to decrypt and authenticate the threat data (905) by reference to a key database 907 (e.g., including a database of keys 913, validity/expiration data, and/or trusted circle/group profiles 917). Of course, if desired, in one embodiment, client data can simply be encrypted or decrypted (909), e.g., without sanitization to ensure anonymity, relying on encryption to keep client identity secret, and using information in the decrypted request to identify client and or group and to store data in a manner that can be searched or correlated in a group-specific manner. In some embodiments where the client data is kept anonymous as to source, the sanitized information can be transmitted with a group identifier 911 (e.g., a trusted circle identifier, or other ID (which does not reveal client identity) and used to access a particular keypool 919 associated with the identified group. The system then attempts (921) to decrypt (or alternatively or in addition), to match a hash of clear-text data transmissions using each key in succession from the identified keypool until a correct result has been obtained (i.e., the hash matches a hash transmitted by the client network with the data), or all keys have been exhausted; per block 923, a correct result (Y) indicates that data is indeed from member of the identified trusted circle or group, whereas a failure to obtain a match (N) invokes an error process 925. Note from these steps that that authenticity can be confirmed or denied simply based on ability to authenticate the hash using potentially many keys, e.g., permitting a structure where the only thing identifying the client network is a generic number or a pointer to a particular keystore (which might contain many keys). In response to a successful match, the hub then logs the newly-reported threat data into the database, per numeral 927. Optionally, this data can be stored (928) together with a client ID (if provided by the client or otherwise decipherable from the authenticated data), or with an identifier of the pertinent keystore, permitting the data both to be stored in encrypted form (e.g., as received form the client, and decrypted upon retrieval using the processes just described) and the data to be associated with a specific group. In addition to logging data and performing correlation services as described, the hub also performs threat correlation and can update scores 929 for a separate database of known threats as previously described (e.g., a set of scored, specific actionable threats, maintained separately from the logged, encrypted data). Many examples are possible; in one embodiment, data is stored in a sanitized but unencrypted format.

Figure 9B:
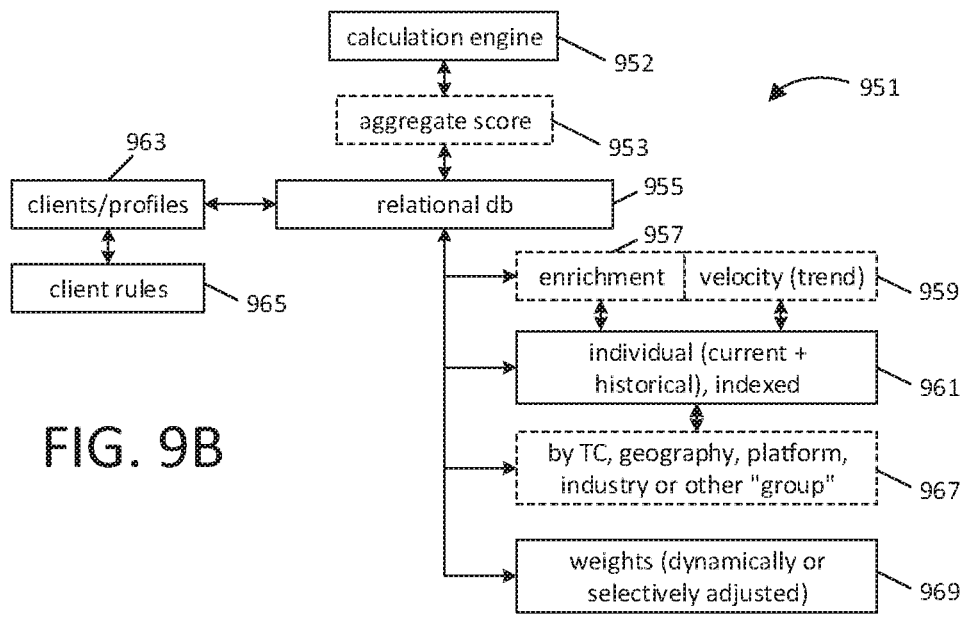
FIG. 9B is a block diagram that shows how scoring is stored and tracked for specific threats or indicators.

FIG. 9B shows a process of updating scores used in some embodiments. This process is generally designated by numeral 951. More specifically, threat data and previously computed scores are made available to a calculation engine, 952, which calculates an aggregate, single score (953) for each known threat that has been the subject of at least some correlation with other data in the security event database. This aggregate score can, in some embodiments, be maintained at multiple hierarchical levels that are dependent on each other, for example, a first score of a particular threat for a first group, a second score of the particular threat for a second group, and so on, with the aggregate score being equivalent to a weighted combination of the respective groups' scores for the particular threat. In one embodiment, the threat scoring is numeric (e.g., 0-100) while in another embodiment, labels can be applied to different threat levels and used to score threats (e.g., high, medium, low, red, white, green, or using a multitude of other different scoring mechanisms). This information is stored in a relational database (955) or otherwise in a manner that permits ready shift between scores for different groups or hierarchal levels (if used), conversion between those scores and propagation of updates across related scores. As noted earlier, the aggregate score for each threat can itself be dependent on a number of scores in different dimensions, for example, an enrichment score (957) and a velocity or trend score (959), as referenced earlier, with these scores optionally being also computed for each different group or hierarchical level. Note that while two base scores are identified as contributing to the aggregate score for a particular threat, in other embodiments, the aggregate only can be used, or alternatively, many more base scores than two can be used, with a weighted combination of those scores used to produce the aggregate. As noted by numeral 961, the relational database (955) also stores historical scores indexed by client network or group, permitting trend analysis (e.g., velocity computation, to determine if the threat or a threat pattern is becoming more or less likely over time); this information can then play a part in thresholding and specification of actions to be taken, as discussed earlier. As noted, when scoring a particular threat (and/or logging data, or taking responsive action), the system can access individual client (or group) profiles 963 and any specific client rules 965. To provide an example of this, a specific client may wish to implement client specific rules that it wishes to be notified (alerted) only for threats with a baseline enrichment score and baseline velocity score, and this information can be retrieved with updated or post comparison scores to determine actions to be taken. As denoted by numerals 967, scoring (and actions to be taken) can vary by trusted circle, geography of attack, operating platform, industry or other forms of groups, and any weightings used to produce group scores or aggregate scoring across groups for a particular threat can be dynamically or selectively adjusted 969 to improve (or reduce) sensitivity or to account for changing conditions.

As should be apparent from the foregoing, this disclosure provides techniques for identifying and responding to threats in a collaborative manner involving a central hub and respective client networks, with techniques for threat prediction and mitigation provided predicated on correlating groups with threat data and taking actions, with the actions optionally conditioned to specific threat levels or scores.

It should be appreciated that this disclosure provides specific examples of system, methods, services and software that greatly enhance network security. For example, this disclosure facilitates the pooling of security event related data among cooperating networks and effective, customized or automatic filtering of sanitized results. These techniques can be extended to any private network, a centralized service (e.g., operated as a service bureau), commercial software products, or another form of implementation.

Figure 10:
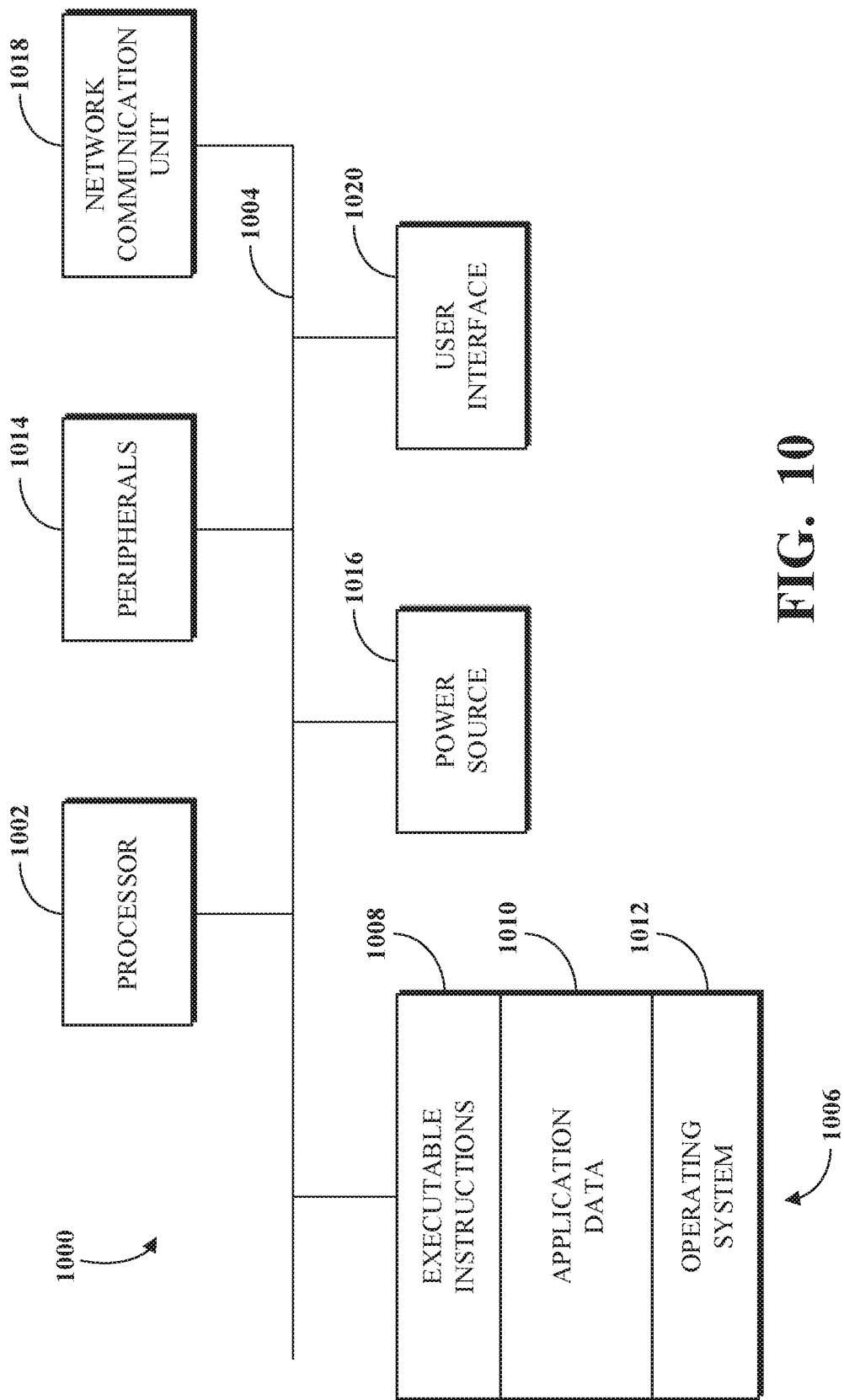
FIG. 10 is a block diagram of an example internal configuration of a computing device of a computer network system.

To describe some implementations in greater detail, reference is first made to examples of hardware structures. FIG. 10 is a block diagram of an example of an internal configuration of a computing device 1000 of a computer network system, such as the hub 105 or one or more of the digital machines 131 shown in FIG. 1 or the central hub/aggregating service 403 or the automated client portals (ACP) 405a-405c of FIG. 4. As previously described, a client or server can be a computing system including multiple computing devices or a single computing device, such as a mobile phone, a tablet computer, a laptop computer, a notebook computer, a desktop computer, a server computer, or other suitable computing devices.

A computing device 1000 can include components or units, such as a processor 1002, a bus 1004, a memory 1006, peripherals 1014, a power source 1016, a network communication unit 1018, a user interface 1020, other suitable components, or a combination thereof.

The processor 1002 can be a central processing unit (CPU), such as a microprocessor, and can include single or multiple processors having single or multiple processing cores. Alternatively, the processor 1002 can include another type of device, or multiple devices, now existing or hereafter developed, capable of manipulating or processing information. For example, the processor 1002 can include multiple processors interconnected in any manner, including hardwired or networked, including wirelessly networked. In some implementations, the operations of the processor 1002 can be distributed across multiple physical devices or units that can be coupled directly or across a local area or other suitable type of network. In some implementations, the processor 1002 can include a cache, or cache memory, for local storage of operating data or instructions.

The memory 1006 can include volatile memory, non-volatile memory, or a combination thereof. For example, the memory 1006 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 1006 can include another type of device, or multiple devices, now existing or hereafter developed, capable of storing data or instructions for processing by the processor 1002. The processor 1002 can access or manipulate data in the memory 1006 via the bus 1004.

Although shown as a single block in FIG. 10, the memory 1006 can be implemented as multiple units. For example, a computing device 1000 can include volatile memory, such as RAM, and persistent memory, such as a hard drive or other storage. The memory 1006 can be distributed across multiple clients or servers, such as network-based memory or memory in multiple clients or servers performing the operations of clients or servers.

The memory 1006 can include executable instructions 1008, data, such as application data 1010, an operating system 1012, or a combination thereof, for immediate access by the processor 1002. The executable instructions 1008 can include, for example, one or more application programs, which can be loaded or copied, in whole or in part, from non-volatile memory to volatile memory to be executed by the processor 1002. The executable instructions 1008 can be organized into programmable modules or algorithms, functional programs, codes, code segments, or combinations thereof to perform various functions described herein. For example, the executable instructions 1008 can include instructions to perform functions associated with a security event aggregator or hub (e.g., as described in relation to FIG. 2A). For example, the executable instructions 1008 can include instructions to perform functions associated with a sentinel or ACP (e.g., as described in relation to FIG. 2B). For example, the executable instructions 1008 can include instructions to perform functions associated with scoring of network threats (e.g., as described in relation to FIG. 3A and FIG. 3B).

The application data 1010 can include, for example, user files, database catalogs or dictionaries, configuration information or functional programs, such as a web browser, a web server, a database server, or a combination thereof. The operating system 1012 can be, for example, Microsoft Windows®, Mac OS X®, or Linux®, an operating system for a small device, such as a smartphone or tablet device; or an operating system for a large device, such as a mainframe computer. The memory 1006 can comprise one or more devices and can utilize one or more types of storage, such as solid state or magnetic storage.

The peripherals 1014 can be coupled to the processor 1002 via the bus 1004. The peripherals can be sensors or detectors, or devices containing any number of sensors or detectors, which can monitor the computing device 1000 itself or the environment around the computing device 1000. For example, a computing device 1000 can contain a geospatial location identification unit, such as a global positioning system (GPS) location unit. As another example, a computing device 1000 can contain a temperature sensor for measuring temperatures of components of the computing device 1000, such as the processor 1002. Other sensors or detectors can be used with the computing device 1000, as can be contemplated. In some implementations, the power source 1016 can be a battery, and the computing device 1000 can operate independently of an external power distribution system. Any of the components of the computing device 1000, such as the peripherals 1014 or the power source 1016, can communicate with the processor 1002 via the bus 1004. In some implementations, a client or server can omit the peripherals 1014.

The network communication unit 1018 can also be coupled to the processor 1002 via the bus 1004. In some implementations, the network communication unit 1018 can comprise one or more transceivers. The network communication unit 1018 can, for example, provide a connection or link to a network, such as the network 145, via a network interface, which can be a wired network interface, such as Ethernet, or a wireless network interface. For example, the computing device 1000 can communicate with other devices via the network communication unit 1018 and the network interface using one or more network protocols, such as Ethernet, TCP, IP, power line communication (PLC), WiFi, infrared, GPRS, GSM, CDMA, or other suitable protocols.

A user interface 1020 can include a display; a positional input device, such as a mouse, touchpad, touchscreen, or the like; a keyboard; or other suitable human or machine interface devices. The user interface 1020 can be coupled to the processor 1002 via the bus 1004. Other interface devices that permit a user to program or otherwise use the computing device 1000 can be provided in addition to or as an alternative to a display. In some implementations, the user interface 1020 can include a display, which can be a liquid crystal display (LCD), a cathode-ray tube (CRT), a light emitting diode (LED) display (e.g., an OLED display), or other suitable display.

An implementation includes means for receiving respective threat data from client networks, means for storing data based on the respective threat data in computer-readable storage as part of a security event database; means for updating a threat score corresponding to a first network threat represented by the respective threat data, the update performed to change the threat score as threat data is received from the client networks dependent on correlation of the first network threat with the respective threat data; means for maintaining affiliations for groups, where the affiliation for a group associates the group with a subset of the client networks; means for detecting correlation between the first network threat and a first one of the groups; and means for, dependent on the affiliation for the first one of the groups, identifying at least one of the client networks and generating at least one message for the at least one of the client networks to convey to the least one of the client networks at least one indicator associated with the first network threat.

All or a portion of the implementations of the systems and techniques described herein can be implemented using a multi-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other multi- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if respective references were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
a processor; and
a memory, wherein the memory includes instructions executable by the processor to cause the processor to:
associate a subset of a plurality of client networks of respective companies of a plurality of companies into a group using an affiliation, wherein the affiliation associates each client network of the subset of the plurality of client networks into the group according to a commonality, and wherein the commonality indicates that each client network of the group is operated by a respective client that operates in an industry common to the group across the plurality of companies;

identify at least one indicator that indicates a presence of a network threat, wherein the network threat is associated with threat data stored in a security event database;

determine that there is an increased risk to the group associated with an increased likelihood that an attack is going to occur based at least in part on the commonality and the at least one indicator;

in response to determining the increased risk to the group, modify a message to be transmitted to a first client network of the group to remove an identity of a second client network of the group from the message, wherein the message comprises instructions for the first client network to search for the at least one indicator;

transmit the message to the first client network;

in response to transmitting the message to the first client network, receive a report from the first client network, wherein the report comprises a detected correlation between the at least one indicator and security event data maintained by the first client network; and update the threat data stored in the security event database in response to receiving the report.

2. The system of claim 1, wherein the memory includes instructions executable by the processor to cause the processor to:

receive the threat data from the plurality of client networks; and identify the group at least in part by detecting a correlation between the group and the network threat represented by the threat data.

3. The system of claim 2, wherein the memory includes instructions executable by the processor to cause the processor to:

in response to receiving the threat data, generate a current numerical score associated with the network threat;

determine that the current numerical score is greater than a previous numerical score, wherein the previous numerical score is associated with the network threat and the group; and in response to determining that the current numerical score is greater than the previous numerical score, determine the increased risk to the group.

4. The system of claim 2, wherein the memory includes instructions executable by the processor to cause the processor to:

decrypt and authenticate the threat data;

verify that a respective client network of the plurality of client networks reporting the threat data was previously registered in a client database, wherein the verification is a cryptographic verification based on the authentication of the threat data; and in response to verifying that the respective client network was previously registered in the client database, store the threat data in the security event database.

5. The system of claim 1, wherein the memory includes instructions executable by the processor to cause the processor to:

include, in the message, a firewall rule configured to mitigate the network threat, wherein the firewall rule is configured to be instantiated on at least one of the plurality of client networks.

6. The system of claim 1, wherein the memory includes instructions executable by the processor to cause the processor to:

decrypt data from the report using one or more cryptographic credentials in a list of cryptographic credentials corresponding to the group;

confirm correspondence of the data decrypted using the one or more cryptographic credentials in the list of cryptographic credentials;

authenticate the report based on the confirmed correspondence; and in response to the authentication of the report, update the security event database to associate the report with the group.

7. The system of claim 1, wherein the memory includes instructions executable by the processor to cause the processor to:

receive the threat data from a respective client network of the plurality of client networks;

identify the group from a plurality of groups based at least in part on a correlation between the group and the network threat represented by the threat data; and in response to detecting the correlation, update a threat score corresponding to the network threat.

8. The system of claim 7, wherein the memory includes instructions executable by the processor to cause the processor to determine to transmit the message to the first client network of the subset of the plurality of client networks of the group based at least in part on a match between a first cryptographic hash corresponding to the respective client network and between a second cryptographic hash corresponding to the first client network.

9. The system of claim 8, wherein the first client network is associated with a client specific rule indicating a threshold value, and wherein an additional client network is associated with an additional client specific rule configured to indicate a different threshold value than the threshold value.

10. The system of claim 1, wherein determining that there is the increased risk to the group comprises determining a static correlation of the threat data with other data stored in the security event database, determining an increasing threat trend associated with the group, determining a decreasing threat trend associated with the group, or any combination thereof.

11. The system of claim 1, wherein the processor transmits the message in response to determining the increased risk to the group and in response to accessing a client specific rule that indicates the first client network requested to be alerted for scores greater than a threshold value, and wherein the increased risk is quantified using a first score, and wherein the first score is greater than the threshold value.

12. A method, comprising:

maintaining affiliations for groups, wherein each group associates a respective subset of a plurality of client networks of respective companies of a plurality of companies using a respective affiliation, wherein the affiliations are generated to affiliate each client network of the respective subset of the plurality of client networks to one of the groups according to a respective commonality between client networks in each respective group, and wherein the respective commonality indicates that each client network affiliated with the respective group is operated by a respective client that operates in an industry common to the respective group;

identifying a group of the groups;

identifying at least one indicator that indicates a presence of a network threat, wherein the network threat is associated with threat data stored in a security event database;

generating a message that comprises instructions for a first client network of the identified group to search for the at least one indicator, wherein the message is generated in response to a determined increased risk to the identified group, and wherein the determined increased risk is associated with an increased likelihood that an attack is going to occur based at least in part on the respective commonality and the at least one indicator;

modifying the message to remove an identity of a second client network of the identified group from the message;

transmitting the message to the first client network;

in response to transmitting the message to the first client network, receiving a report from the first client network, wherein the report comprises a detected correlation between the at least one indicator and security event data maintained by the first client network; and updating the threat data stored in the security event database in response to receiving the report.

13. The method of claim 12, comprising:
receiving the threat data from the plurality of client networks;
storing the threat data in the security event database; and
processing content in the security event database to identify the identified group by detecting a correlation between the threat data and the identified group.

14. The method of claim 12, comprising:
maintaining a threat score associated with the network threat;
receiving a local score that is based on the detected correlation between the at least one indicator and the security event data maintained by the first client network; and
updating the threat score based at least in part on the local score.

15. A non-transitory, tangible, computer-readable storage medium storing instructions that, when executed by a processor, facilitate performance of operations for aggregating computer network threat information from multiple networks to enhance computer network security, the operations comprising:
receiving, at a receiving network of the multiple networks from a hub configured to modify messages to remove an identity of a respective client network of the multiple networks before transmitting the messages, a modified message configured to instruct the receiving network to initiate a search of the receiving network for an indicator that indicates a presence of a network threat, wherein the modified message is received based at least in part on an affiliation of the receiving network with one or more of the multiple networks indicating that the receiving network and the one or more of the multiple networks are associated with a same industry, wherein each of the multiple networks correspond to respective companies of a plurality of companies associated with the same industry, wherein the modified message is generated in response to a determination of increased risk to the one or more of the multiple networks, and wherein the increased risk is associated with an increased likelihood that an attack is going to occur based at least in part on the affiliation and the indicator;

in response to receiving the modified message, initiating the search of the receiving network to detect a correlation between the indicator and security event data maintained by the receiving network;

generating a report configured to indicate the correlation between the indicator and the receiving network; and transmitting the report to the hub.

16. The non-transitory, tangible, computer-readable storage medium of claim 15, wherein the operations comprise:
anonymizing the report at least in part by removing information identifying the receiving network from the report; and
transmitting the report to the hub after the report is anonymized.

17. The non-transitory, tangible, computer-readable storage medium of claim 15, wherein the operations comprise:
in response to the search of the receiving network, identifying a local score for the network threat based on the correlation between the indicator and the security event data; and
transmitting the local score to the hub.

18. The non-transitory, tangible, computer-readable storage medium of claim 15, wherein the operations comprise:
in response to the search of the receiving network, generating a local score based on the correlation between the indicator and the security event data;
performing a trend analysis to determine whether the local score indicates the increased risk to the receiving network; and
in response to determining that the local score indicates the increased risk to the receiving network, transmitting the local score to the hub.

19. The non-transitory, tangible, computer-readable storage medium of claim 15, wherein the operations comprise:
in response to the search of the receiving network, generating a local score based on the correlation between the indicator and the security event data;
determining that the local score satisfies a condition; and
in response to determining that the local score satisfies the condition, transmitting the local score as the local score to the hub, wherein the hub is configured to reconcile the local score with a score maintained by the hub corresponding to the receiving network and the network threat.

20. The non-transitory, tangible, computer-readable storage medium of claim 19, wherein the operations comprise:
using one or more of the following as the condition:
determining that the local score is greater than a threshold; or
determining that the local score is to be processed by the hub based at least in part on a hysteresis function.

21. The method of claim 14, comprising:
receiving an indication from the first client network of an attack occurring on the first client network that corresponds to the message;
increasing the threat score; and
sending an additional message with the increased threat score to other client networks of the identified group.

* * * * *